(12) United States Patent
O'Donnell

(10) Patent No.: US 9,515,597 B2
(45) Date of Patent: Dec. 6, 2016

(54) ELECTRIC MACHINE

(71) Applicant: RIFT TECHNOLOGY LIMITED, Worcestershire (GB)

(72) Inventor: James O'Donnell, Worcestershire (GB)

(73) Assignee: RIFT TECHNOLOGY LIMITED, Worcestershire (GB)

( * ) Notice: Subject to any disclaimer, the term of this patent is extended or adjusted under 35 U.S.C. 154(b) by 0 days.

(21) Appl. No.: 14/648,882

(22) PCT Filed: Nov. 26, 2013

(86) PCT No.: PCT/GB2013/053115
§ 371 (c)(1),
(2) Date: Jun. 1, 2015

(87) PCT Pub. No.: WO2014/087134
PCT Pub. Date: Jun. 12, 2014

(65) Prior Publication Data
US 2015/0318812 A1    Nov. 5, 2015

(30) Foreign Application Priority Data
Dec. 5, 2012 (GB) .................................. 1221861.6

(51) Int. Cl.
*H02P 27/04* (2016.01)
*H02P 25/22* (2006.01)
(Continued)

(52) U.S. Cl.
CPC ............... *H02P 25/22* (2013.01); *B60L 1/003* (2013.01); *B60L 7/12* (2013.01); *B60L 11/14* (2013.01); *B60L 11/1805* (2013.01); *B60L 11/1877* (2013.01); *B60L 15/20* (2013.01);
(Continued)

(58) Field of Classification Search
CPC ........ H02P 27/04; H02P 25/22; H02K 16/02
USPC ....... 180/65.265, 221, 247, 53.1, 54.1, 65.1, 180/65.21, 65.26, 65.235, 65.285, 65.28; 318/139, 140, 400.01, 400.14, 400.15, 318/700, 779, 799, 800, 801, 727, 430, 432, 318/437, 805, 807; 363/40, 44, 95, 120, 363/174, 175
See application file for complete search history.

(56) References Cited

U.S. PATENT DOCUMENTS 6,209,672 B1 * 4/2001 Severinsky ............ B60K 6/442
                                                         180/65.23
9,067,592 B2 * 6/2015 Kobayashi ............ B60W 10/06
(Continued)

FOREIGN PATENT DOCUMENTS

DE    102007030018    1/2008
EP       1615319       1/2006
(Continued)

OTHER PUBLICATIONS

Search Report issued in Int'l App. No. PCT/GB2013/053115 (2014).

*Primary Examiner* — Antony M Paul
(74) *Attorney, Agent, or Firm* — Barnes & Thornburg LLP

(57) ABSTRACT

An electric machine has a primary mechanical output or input, a plurality of electric sub-machine rotors each having an output or input shaft, a plurality of electric sub-machine stator magnets proximate the rotors, a drive train connecting each of the output or input shafts of the plurality of electric sub-machine rotors to simultaneously drive, or be driven by, the primary output shaft. Each sub-machine is selectively engaged or disengage depending on machine power.

17 Claims, 18 Drawing Sheets

(51) Int. Cl.
  *H02K 16/02*    (2006.01)
  *H02K 7/108*    (2006.01)
  *F16H 37/06*    (2006.01)
  *H02P 5/747*    (2006.01)
  *H02K 16/00*    (2006.01)
  *B60L 1/00*     (2006.01)
  *B60L 7/12*     (2006.01)
  *B60L 11/14*    (2006.01)
  *B60L 11/18*    (2006.01)
  *B60L 15/20*    (2006.01)

(52) U.S. Cl.
  CPC ........ B60L 15/2054 (2013.01); F16H 37/065 (2013.01); H02K 7/108 (2013.01); H02K 16/00 (2013.01); H02K 16/02 (2013.01); H02P 5/747 (2013.01); *B60L 2240/12* (2013.01); *B60L 2240/421* (2013.01); *B60L 2240/423* (2013.01); *B60L 2270/142* (2013.01); *B60L 2270/145* (2013.01); *Y02B 10/30* (2013.01); *Y02T 10/641* (2013.01); *Y02T 10/645* (2013.01); *Y02T 10/70* (2013.01); *Y02T 10/7005* (2013.01); *Y02T 10/705* (2013.01); *Y02T 10/7077* (2013.01); *Y02T 10/72* (2013.01); *Y02T 10/7275* (2013.01)

(56) References Cited

U.S. PATENT DOCUMENTS

| | | |
|---|---|---|
| 2007/0029887 A1 | 2/2007 | Murota et al. |
| 2012/0081059 A1 | 4/2012 | Romig |
| 2013/0091694 A1* | 4/2013 | Hussain ................ B60W 20/00 29/593 |
| 2013/0147403 A1 | 6/2013 | Romig |

FOREIGN PATENT DOCUMENTS

| | | |
|---|---|---|
| EP | 2436950 | 4/2012 |
| GB | 757515 | 9/1956 |
| WO | WO 2013/041842 | 3/2013 |

* cited by examiner

| A<br>No. Motors | B<br>Volts (V) | C<br>Amps (A) | D<br>Torque per motor (Nm) | E<br>Total torque (A*D) (Nm) | F<br>Copper Volume Saving | G<br>Magnet Volume Saving |
|---|---|---|---|---|---|---|
| 1 | 12 | 6 | 60 | 60 | 0% | 0% |
| 2 | 12 | 3 | 30 | 60 | 37% | 26% |
| 3 | 12 | 2 | 20 | 60 | 61% | 45% |
| 4 | 12 | 1.5 | 15 | 60 | 69% | 56% |
| 5 | 12 | 1.2 | 12 | 60 | 75% | 62% |
| 6 | 12 | 1 | 10 | 60 | 80% | 70% |
| 7 | 12 | 0.86 | 8.57 | 60 | 84% | 75% |
| 8 | 12 | 0.75 | 7.5 | 60 | 84% | 75% |
| 9 | 12 | 0.67 | 6.67 | 60 | 88% | 75% |
| 10 | 12 | 0.6 | 6 | 60 | 88% | 80% |
| 11 | 12 | 0.55 | 5.45 | 60 | 90% | 80% |
| 12 | 12 | 0.5 | 5 | 60 | 90% | 80% |
| 13 | 12 | 0.46 | 4.62 | 60 | 90% | 80% |
| 14 | 12 | 0.43 | 4.29 | 60 | 92% | 80% |
| 15 | 12 | 0.4 | 4 | 60 | 92% | 80% |
| 16 | 12 | 0.38 | 3.75 | 60 | 94% | 80% |
| 17 | 12 | 0.35 | 3.53 | 60 | 94% | 80% |
| 18 | 12 | 0.33 | 3.33 | 60 | 94% | 90% |
| 19 | 12 | 0.32 | 3.16 | 60 | 94% | 90% |
| 20 | 12 | 0.3 | 3 | 60 | 94% | 90% |
| 21 | 12 | 0.29 | 2.86 | 60 | 94% | 90% |
| 22 | 12 | 0.27 | 2.73 | 60 | 95% | 90% |
| 23 | 12 | 0.26 | 2.61 | 60 | 95% | 90% |
| 24 | 12 | 0.25 | 2.5 | 60 | 95% | 90% |

Fig. 1

ELECTRIC MACHINE

CROSS REFERENCE TO RELATED APPLICATIONS

This application is a U.S. nationalization under 35 U.S.C. §371 of International Application No. PCT/GB2013/053115, filed Nov. 26, 2013, which claims priority to United Kingdom Patent Application No. 1221861.6, filed Dec. 5, 2012. The disclosures set forth in the referenced applications are incorporated herein by reference in their entireties.

The present invention is concerned with an electric machine. More specifically, the present invention is concerned with an electric motor or electric generator.

The present application is concerned with rotary electric machines, whether full and continuous machines (such as motors driving a continuous rotary output or generators driven by a continuous rotary input) or partial rotation machines designed to rotate through a predetermined angle.

Electric motors are one form of electric rotary actuator, and use an electric input to produce a mechanical rotary output (a torque). Such motors are used in a wide variety of technical fields, and different types of motor are used for different applications, depending on the nature of the electrical input (e.g. AC/DC, phase etc) and the nature of the mechanical output required (high force low speed, low force high speed).

Most electric motors utilise the electromagnetic effect to convert energy from electrical to mechanical. This typically involves placing a rotor within a magnetic field established by a stator. The stator may be a permanent magnet, or an electromagnet.

A current is passed through a set of conductive windings in the rotor such that the rotor turns within the magnetic field. An output shaft connected to the rotor provides the mechanical output.

The conversion from mechanical to electrical energy is well practised in the art. Electrical generators use a mechanical input to produce electrical power, which may be used for a variety of purposes. Generators are used from a local scale (domestic/backup generators, domestic wind turbines) to an industrial scale (power plants, industrial wind turbines). Generators tend to have specific characteristics depending on the field in which they are employed. For example, domestic generators are generally configured to provide and output voltage and AC frequency akin to the domestic supply.

Generally speaking, most generators utilise the electromagnetic effect to convert energy from one form the other. This typically involves placing a conductive rotor within a magnetic field established by a stator and rotating the rotor to generate a current therein. This current is the electrical output of the generator.

Known electric machines exhibit several problems.

Firstly, copper is often used for the rotor (and possibly stator) windings. Copper is both expensive and heavy. Due to demand in recent years, and increasing demand for the future as electrical actuation becomes more prevalent, it is likely to further increase in cost.

There is a drive to make electric machines more efficient both to manufacture and to operate (i.e. in terms of the percentage of energy successfully converted to the desired form of output). Improvements such as low friction materials for the rotor bearings, low friction brushes in brushed motors, high efficiency gear trains and such like have provided incremental increases.

Many motors in particular are used in applications where it is highly beneficial to be as light as possible. Motors for actuation in vehicles in particular benefit from being lighter, because their overall efficiency of the vehicle can be reduced. This benefits commercial aircraft, UAVs as well as electric and hybrid automobiles.

Higher efficiency is beneficial for battery powered motors because the batteries will last longer, thereby reducing the frequency of battery changes as well as the cost and environmental impact of battery production and disposal.

Due to the level of precision required in motor design, as well as the high part count, electric machines can often make up the bulk unit cost of many products, particularly domestic products. As such, there is a need to reduce the cost of motors which will have a significant beneficial effect on the cost of the overall product.

A further disadvantage of known electric machines is that high power motors require significant current at the motor terminals. This is a safety concern.

A yet still further disadvantage is that electric machines emit radio frequency signals which may interfere with other electronics.

There are various applications for known electrical power generators. Wind turbines use such generators to convert the kinetic energy of their blades into electrical energy. Vertical axis wind turbines (VAWTs) are known, but are often too heavy and cumbersome for use in the domestic environment. Furthermore, the forces they exert in use are often too high for domestic or light industrial applications.

Currently, horizontal axis wind turbines (HAWTs) are slow turning as they use large single rotor electric power generators. These large generators convert motion into electricity at high torque and low speed, hence the requirement for slow turning blades (i.e. they are designed to suit the generator).

Because HAWTs are low speed, they create noise and vibration in the form of low frequency harmonics, which can travel great distances and cause environmental problems (for example to wildlife).

It is an aim of the present invention to provide an improved electric machine.

According to a first aspect of the invention there is provided an electric machine comprising:
 a primary mechanical output or input;
 a plurality of electric sub-machines configured to selectively drive, or be driven by, the primary mechanical output or input respectively;
 a controller configured to:
 monitor a parameter of the electric machine indicative of the power of the electric machine; and,
 engage or disengage one or more of the plurality of electric sub-machines dependent upon the monitored parameter, so as to increase the number of sub-machines simultaneously driving, or being driven by, the primary mechanical output or input respectively at higher electric machine powers.

There are various methods of engagement and disengagement:

Each of the sub-machines may comprise a rotor, in which each rotor is configured to be mechanically disengaged from the mechanical input or output to disengage the respective sub-machine. For example, each rotor may be connected to the input or output shaft by a clutch.

Each of the sub-machines may be configured to be selectively electrically disengaged. In other words the power input/output to the sub-motor or sub-generator may be disconnected, electronically or mechanically.

In a further alternative, each of the sub-machines may comprise a rotor and a stator, in which at least one of the rotor and stator can be moved to reduce their electromagnetic interaction upon disengagement. In other words, the rotor and stator can be moved further apart. In the case of a brushless motor, the stator can be moved to reduce the drag on the stator cause by inducing a current in the stator winding.

Preferably the monitored parameter is representative of electrical power consumed or generated. This may be in the form of a current and voltage measurement.

The controller is preferably configured to store sub-machine usage information, engage and disengage each sub-machine based on the sub-machine usage information. The controller may be configured to engage sub-machines with lowest usage first, and configured to disengage sub-machines with highest usage first.

The controller may be configured to engage a further sub-machine of the plurality of sub-machines at a power interval, in which each sub-machine has a maximum rated power of at least twice the power interval. This ensures that for typical electric motors and generators, they are operated at peak efficiency, rather than maximum power (which is less efficient). More preferably each sub-machine has a maximum rated power of at least three times the power interval.

According to a second aspect of the invention there is provided a method of operating an electric machine, comprising the steps of:
  providing an electric machine having a primary output or input and comprising a plurality of electric sub-machines configured to selectively drive, or be driven by, the primary mechanical output or input respectively;
  monitoring a parameter of the electric machine indicative of the power of the electric machine; and,
  engaging or disengaging one or more of the plurality of electric sub-machines dependent upon the monitored parameter, so as to increase the number of sub-machines simultaneously driving, or being driven by, the primary mechanical output or input respectively at higher electric machine powers.

The step of engaging or disengaging one of the sub-machines, may be a mechanical, electrical or magnetic disengagement. In the latter case, the rotor and stator are disengaged.

Preferably the monitored parameter is representative of electrical power consumed or produced by each sub-machine.

Preferably the method comprises the steps of:
  electronically storing sub-machine usage information;
  selecting a sub-machine to engage or disengage based on the usage information; and,
  engaging or disengaging the selected sub-machine.

Preferably the step of selecting comprises the step of selecting the sub-machine with the lowest usage, and engaging the selected sub-machine. Preferably the step of selecting comprises the step of selecting the sub-machine with the highest usage, and disengaging the selected sub-machine.

The method may comprise the steps of:
  engaging a first sub-machine at a first electric machine power;
  engaging a second submachine at a second electric machine power, the second machine power being a power interval greater than the first power;
  in which the power interval is less than half the rated power of the second sub-machine.

More preferably the power interval is less than one third of the rated power of the second sub-machine.

According to a third aspect of the present invention there is provided an electric machine comprising: a primary mechanical output or input, a plurality of electric sub-machine rotors, a plurality of electric sub-machine stator magnets proximate the rotors, a drive train connecting the output or input of the plurality of electric sub-machine rotors to simultaneously drive, or be driven by, the primary output or input shaft.

The machine may be an electric motor, in which case it comprises: a primary mechanical output, a plurality of electric sub-motor rotors, a plurality of electric sub-motor stator magnets proximate the rotors, a drive train connecting the output of the plurality of electric sub-motor rotors to simultaneously drive the primary output shaft.

The motor according to the present invention is intended to replace a conventional, single rotor electric motor.

Preferably at least two of the plurality of rotors share a common stator magnet. This is beneficial in reducing the amount of magnetic material required, which in turn reduces the cost and weight of the actuator. If the stators are electromagnets, copper winding material and electricity in powering them.

More than one rotor can be arranged on a single shaft, the rotors having individual stators, or a pair of unitary stators running the length of the shaft, resulting in a long, thin rotor arrangement. A benefit of driving a single shaft with more than one rotor is that the number of gears is reduced.

Each rotor arrangement may be provided in layers, stacked on top of each other and using common shafts spanning the layers. This also reduces the number of gears required. The commutators for such a system may be combined or stacked.

Preferably the motor comprises at least 3 rotors, each of which shares a stator magnet with an adjacent rotor. Preferably each rotor is configured to rotate in the same rotational direction in use. This allows each output to drive a common primary output gear.

Alternatively, the motor may comprise a plurality of separate electric sub-motors, each comprising individual rotors and stators. In this way, the invention can be manufactured using a number of "off the shelf" sub-motors. Preferably the motor comprises at least 3 separate electric sub-motors.

The provision of a plurality of electric sub-motor rotors in order to provide the required output has many advantages over the prior art, including a significant saving in the weight of the motor, as well as the weight of a gear box, which can be constructed from more lightweight material due to the division of the total output torque required across the number of sub-motors installed (e.g. six sub-motors would each provide one sixth of the torque etc). Therefore e.g. plastics materials may be used where metals were previously required.

Preferably the drive train comprises a substantially identical gear assembly for each of the plurality of sub-motors, each gear assembly configured to gear the output of the respective sub-motor, and each gear assembly engaged with a primary output gear connected to the primary output shaft.

The gear assemblies may be engaged with the primary output gear at equally spaced positions around the primary output gear. This results in a mechanically balanced output, reduced noise and wear on the rotor bearings or bushes.

The primary output gear is preferably fixed for rotation with the primary output shaft.

Each gear assembly may comprise at least:
an initial stage configured to gear the output from the respective sub-motor,
a first intermediate stage configured to gear the output from the first stage, and,
a final stage configured to engage the primary output gear.

Each gear assembly may comprise a second intermediate stage between the first intermediate stage and the final stage. This allows even higher gear ratios. It is advantageous because smaller electric motors tend to run optimally at higher speeds.

Preferably the initial stage and the second intermediate stage are coaxially aligned, and preferably the initial stage and the second intermediate stage are mounted on a first common shaft, and are arranged to contra-rotate on the first common shaft.

The first intermediate stage and the final stage may be coaxially aligned.

Preferably the first intermediate stage and the final stage are mounted on a second common shaft, and are arranged to contra-rotate on the second common shaft.

By aligning gear stages on a common shaft and allowing them to contra-rotate, the shaft becomes less prone to noise, vibration and high forces in use as it is stabilised by the contra-rotating action.

A motor according to the third aspect can be combined with the first and second aspects of the invention.

The machine may be an electrical generator, in which case it comprises: a primary mechanical input, a plurality of electric sub-generator rotors, a plurality of electric sub-generator stator magnets proximate the rotors, a drive train driving the plurality of electric sub-generator rotors from the primary input shaft such that each rotor simultaneously generates a current upon rotation of the primary mechanical input.

Preferably at least two of the plurality of rotors share a common stator magnet. Preferably each rotor which shares a stator magnet with an adjacent rotor.

Preferably each rotor is configured to rotate in the same rotational direction in use.

As an alternative to providing a number of rotors using common stators, the generator may comprise a plurality of separate electric sub-generators, each comprising rotors and stators. This allows off the shelf components to be used to construct a generator according to the invention.

Preferably at least 3 separate electric sub-generators are provided.

Preferably the drive train comprises a substantially identical gear assembly for each of the plurality of rotors, each gear assembly configured to gear the input to the respective rotor, and each gear assembly engaged with a primary input gear connected to the primary input shaft.

The gear assemblies are preferably engaged with the primary input gear at equally spaced positions around the primary input gear.

The primary input gear is fixed for rotation with the primary input shaft.

Preferably each gear assembly comprises at least:
an initial stage configured to engage the primary input gear,
a first intermediate stage configured to gear the output from the first stage, and,
a final stage configured to engage the respective rotor.

Each gear assembly may comprise a second intermediate stage between the first intermediate stage and the final stage, in which case the initial stage and the second intermediate stage can be coaxially aligned. The stages can be mounted on a first common shaft, and arranged to contra-rotate to reduce vibration and eccentric forces.

Preferably the first intermediate stage and the final stage are coaxially aligned.

The first intermediate stage and the final stage may also be mounted on a second common shaft, and arranged to contra-rotate.

Due to the reduced (split) torque on the gear arrangements, the drive train may comprise gears constructed from a plastics material in certain applications.

A motor according to the fourth aspect can be combined with the first and second aspects of the invention, and indeed the third aspect for a combined motor/generator.

The following is an example of the benefits of a multi-core motor compared to a single-core motor. The same logic applies for generators, and as such these benefits are apparent in electric machines constructed in accordance with the first to fourth aspects of the invention.

A traditional brushed electric motor of a known actuator may run at 12V DC at 3 A, providing (for example) 60 mNm of output torque at 6000 rpm (628 rad/s). This may be referred to as original motor A "OM-A". Such gear boxes are known in the art and reduce the speed by a factor of 2000 whilst increasing the torque by the same factor. Such a combined actuator and gear box will be referred to as original motor system "OMS-A".

In OMS-A, losses through the gear box may be assumed to be 1 to 2% of the total output.

The present invention breaks the single OM-A motor, referenced above, into six individual, smaller sub-motors with the aim of producing the same mechanical output. The composite motor is known as CNM-A.

If the rotor coil of the above referenced motor is split into sub-motors having six equal parts, each new individual sub-motor would provide 10 mNm at 6000 rpm (one-sixth of the output torque at the same speed). By summing the output torques at the same speed, the same output as the original single motor system OM-A described above, would be provided.

It will be noted that each new smaller sub-motor (which we will referred to as NM-1 to NM-6) will each only be required to carry one-sixth of the current, that is 0.5 A at 12V DC. It will also be noted that the rotor wire needs only to be one-sixth of the thickness in order to carry this smaller current. As such, the amount of wire mass required for the six individual sub-motors compared with the original motor OM-A is approximately 80% less (i.e. only 20% or one fifth of the original wire mass).

OM-A is a permanent magnet DC motor. As such the stator contains a permanent magnet. Because the power requirement of each sub-motor is relatively low, the magnetic flux across the sub-motor coil is also lower than the equivalent single rotor motor. In other words, each of NM-1 to NM6 requires one sixth of the flux (and thus one sixth of the magnetised material).

In addition the rotor of NM-1 to NM-6 is much smaller than OM-A. Therefore the gap required between the stators in order to surround the rotor of each sub-motor is reduced. As such as well as requiring one sixth of the flux, each motor only requires it to be established across a smaller gap. This leads to a further benefit, by an inverse square law relative to the amount of magnetic material required. Therefore each of NM-1 to NM-6 requires less than one-sixth of the magnetic material in OM-A. In reality, the approximate size and weight reduction of the total magnet mass is approximately 80%.

In a similar system which utilises electro-magnets to establish the magnetic field of the stator, a similar power reduction into the stator coils would also be realised. This is because the strength of the magnetic field is dependent upon the power within the electromagnetic coil, and the air gap, both of which can be reduced for smaller motors.

Turning to FIG. 1, various combinations of motors are shown in tabular form. The columns are as follows:

| | |
|---|---|
| Column A | Number of sub-motors |
| Column B | Potential difference across each sub-motor input |
| Column C | Current used per sub-motor |
| Column D | Output torque per sub-motor |
| Column E | Summed output torque |
| Column F | Percentage copper saving on rotor wire material |
| Column G | Percentage saving on magnetic material in stators. |

Because the diameter of the rotor wire decreases the smaller the rotor is, the cross-sectional area also decreases and hence the amount of copper required.

The total torque output is always 60 Nm (at the same speed for each arrangement). With the reduction in current comes the associated reduction in core wire diameter, and an associated reduction in cross sectional area in mm2 (which is proportional to the copper mass used). The final column represents the reduction in copper material required. The present example uses 6 motors and as such realises a reduction of about 80%.

An additional benefit of the present invention is that the reduction of current in each sub-motor NM-1 to NM-6 means that the brushes can be made from steel, rather than carbon, which in part results in a much longer life of the motor. For example, a typical steel brush small motor of the above type will last approximately 875 hours compared to OM-A which may only last 500 hours.

Small rotors have a high start-up torque and larger rotors have a lower star-up torque but a comparatively high running torque at low speed. A further benefit of the present invention is to provide both a high speed and a high torque from the same unit. Stall speed is also improved.

Preferably the plurality of electric sub-motors comprises at least 4 to 6 motors, more preferably 6 (although any number is envisaged). As can be seen from FIG. 1, the benefit in terms of copper saving becomes less as the number of motors increases. 6 sub-motors is a compromise between this saving and complexity/cost of manufacture.

Each gear assembly, or drive train is only required to handle one-sixth of the torque of the original prior art motor design and, as such, each of the gears can be constructed from light-weight, low-strength materials such as plastics materials. It will be noted that only the final output gear and shaft needs to be able to carry the entire torque output of the system. Therefore the primary output gear may also be constructed from a plastic material.

This results in a significant weight saving and manufacturing cost saving over the prior art systems, which typically require metal gears.

An experiment on a known industrial ball valve results in a known single-core motor (24V, 0.6 A) turning the valve through 90 degrees (from an open to a shut position) in 16 seconds. Using six smaller sub-motors with the same total power requirement (24V, 0.6 A) turns the same valve in 3 seconds. This is a clear energy saving of around 80%.

Further benefits in materials saving can be seen by using common stators for sets of rotors. For example a single permanent magnet stator positioned between two rotors may replace two such stators.

Turning to FIG. 3a, the characteristics of a known electric motor OM-A are shown. The x-axis represents output torque (T), and the y-axis represents either current (A), speed (S), output power (P) or efficiency percentage (E).

Known motors are usually run at maximum power (P)—i.e. around point P1 in FIG. 3a because it provides the best power-weight ratio. As will be noted, the efficiency E is far from the maximum possible. Operating at maximum efficiency (point P2) will not provide a beneficial power to weight ratio.

Turning to FIG. 3b, the characteristic of CNM-A is shown. The x-axis scale is the same. As a result of the above-mentioned weight saving by splitting the motor into several sub-motors, each motor NM-1 to NM-6 can be overspecified. The additional mass from overspecification of the motors would not be problematic as it is offset by the aforementioned savings. By overspecifiying the motors, each can be run nearer to its peak efficiency, whilst providing an improved power to weight ratio over OM-A (i.e. run at point P3).

It will be noted that the starting efficiency of the composite motor CNM-A in FIG. 3b is not as high as the eventual running efficiency. To run CNM-A across a broad range of speeds, the invention according to the first and second aspects can be employed. This is shown in FIG. 3c.

As the composite motor CNM-A starts, only one of the sub-motors NM-1 is engaged to drive the output (the remaining motors are disengaged mechanically or electro-magnetically). As the power (P) of the composite motor CNM-A increases past a first threshold T1, a second sub-motor NM-2 is engaged. The first threshold T1 is at the point where the efficiency (E) of a single motor is about to drop off, and as such the addition of a second motor NM-2 "stretches" the efficiency curve.

Again, the efficiency of two motors will eventually drop off, and at threshold T3, a third sub-motor NM-3 is engaged, and so on. In this manner, the efficiency of the composite motor CNM-A is kept at a high level, and also relatively constant across the operating range. As such, CNM-A can be run across a large range of powers with high efficiency, unlike known motor OM-A.

The invention according to the first to fourth aspects is suitable for use in a range of applications.

According to the invention there is provided a fluid pump comprising a motor according to one of the first to fourth aspects.

The pump may be a liquid pump in the domestic, commercial or industrial field, for example:

pumps in heating systems,
fuel pumping systems,
pumps for swimming pools,
pressure pumps in fire engines, hoses and fountains,
pumps in drinks coolers and ice making machines,
pumps in oil refineries, chemical, pharmaceutical & power generating plants,
pumps in drinks manufacturing,
pumps in refrigeration and freezer systems,
pumps in ships/boats/submarines,
pumps in water cooling systems, cooling towers, server room temperature control,
pumps in mines for de-watering or similar,
pumps in de-salination plants, reverse osmosis plants,
pumps in breweries, distilleries, bottling plants,
pumps in the utility water industry, waste water treatment and sewage treatment,
filtration systems i7n the water industry, and
pumps in pressure washers and showers.

The pump may be a gas pump in the domestic, commercial or industrial field, for example:
  pumps for air conditioning units,
  exhaust pumps/fans in mines,
  air circulation fans,
  extraction fans,
  gas circulation units in the gas industry,
  gas circulation units in liquid bottling plants,
  motors in compressors, and
  domestic, commercial and industrial ventilation systems.

According to the invention there is provided a conveyor comprising a motor according to at least one of the first to fourth aspects. The conveyor may be employed in, for example:
  industrial conveyor belts,
  baggage handling systems,
  baggage carousel (airport),
  freight handling systems,
  moving walkways,
  pedestrian walkways,
  residential stair lifts,
  ski chair lifts,
  escalators,
  vehicle loading ramps,
  wheelchairs and mobile chairs, and
  mobile seating in lecture theatres and sports arenas.

According to a the invention there is provided an aircraft system comprising a motor according to one of the first to fourth aspects. The system may be employed in, for example:
  helicopter rotor drive motors,
  propeller motors,
  flaps and control surfaces,
  landing gear deployment,
  remote control aeroplane or helicopter motors,
  aeroplane or helicopter doors,
  aeroplane extending entry ramps,
  cargo bay doors,
  loading ramps, and
  microlite aircraft.

According to the invention there is provided an aerospace system comprising a motor according to at least one of the first to fourth aspects. The system may be employed in, for example:
  large crawler systems for transporting heavy items,
  systems for unfurling solar panels,
  control systems for telescopes or other instrumentation,
  air recycling systems,
  environmental control systems,
  cargo doors,
  robotic arms and booms, and,
  assisted movement in spacesuits.

According to the invention there is provided a domestic, commercial or industrial appliance comprising a motor according to at least one of the first to fourth aspects. The appliance may be, for example:
  a blender,
  a fridge,
  a freezer,
  a dish/glass washer,
  a tumble dryer,
  a washing machine,
  a microwave,
  a toaster,
  a rotary oven,
  a spit roasting machine,
  a hand drier,
  a hair dryer, or,
  a power tool.

According to the invention there is provided a fairground or theme park ride comprising a motor according to at least one of the first to fourth aspects. The ride may be, for example:
  a carousel,
  a ferris wheel,
  a roller coaster, or,
  dodgems.

According to the invention there is plant machinery comprising a motor according to at least one of the first to fourth aspects. The machinery may be, for example:
  grader systems for roads,
  digger scoops and arms,
  dumper tipping systems,
  cement mixer mobile, or,
  cement mixer vehicle based.

According to the invention there is provided a vehicle comprising a motor according to at least one of the first to fourth aspects used as a drive source. The vehicle may be, for example wheel hub or engine replacement/hybrid system, or used as a starter motor.

According to the invention there is provided a vehicle electrical generator according to at least one of the first to fourth aspects.

This may be provided as:
  An alternator,
  A combined motor/generator in a hybrid vehicle,
  A kinetic energy storage system for regenerative braking.

The vehicle may be a car or truck for example, or on a hybrid train.

According to the invention there is provided a power generation system comprising an electrical generator according to at least one of the first to fourth aspects.

For example, vertical axis wind turbines (VAWTs) are unsuitable for many buildings due to their size and weight. VAWTs are desirable because they do not need to be oriented based on the wind direction. Domestic and light industrial structures are not designed to take the loads induced by commercially available VAWTs. Most of the mass is within the electrical generator (which in the prior art s single-core).

The present invention allows a significant mass saving, making (for example) a 4.2 kW domestic wind turbine power generator weigh about 2.5 kg, which can easily be installed in most domestic settings.

In a VAWT, multiple generators may be stacked between sets of blades, and arranged about a common axis. A pair or pairs of blades could be provided which counter-rotate thus reducing eccentric forces, vibration and noise.

Preferably the wind turbine comprises a first blade arrangement connected to the primary input of a first electric generator according to the present invention, and a second, coaxial blade arrangement connected to the primary input of a second, electric generator according to the present invention. Preferably the first and second blade arrangements are arranged to counter-rotate about a common axis.

Advantageously, this counter-rotation balances the forces on the turbine and produces more even loading at the turbine mounting point.

Preferably the sub-generator rotors of the wind turbine power generators are evenly spaced around the axis of the VAWT. This alleviates any uneven loading an gyroscopic effect associated with a single offset generator.

It is to be understood that by "blade" we mean any structure capable of producing movement based on airflow, not limited to aerofoils alone.

The present invention is also applicable to horizontal axis wind turbines (HAWT). Generally speaking, smaller rotors/generators are optimally run at a higher speed and lower torque than large rotors/generators. Because the present invention proposes splitting the torque between several sub-generator rotors, the generator can run at both high speed and high torque. As such, the HAWT can be run at higher speed, reducing the problems with the low frequency harmonics. It will be noted that higher frequency vibrations are attenuated faster than low frequency vibrations according to an inverse-cube law, which means that they will not travel as far.

Like the VAWT, a stack of several generators according to the present invention may be provided.

The use of several sub-generators according to the present invention also allows then to be removed and repaired or replaced without significantly affecting the use of the turbine. The remaining rotor sets can continue to generate electricity.

The present invention is also suitable for use in:
Water turbines/hydroelectric plants,
Water wheels,
Nuclear power stations (for e.g. steam turbines),
Gas/oil/coal power stations,
Wave/tidal power.

With respect to wave power, the present invention is particularly well suited to snake type systems in which a series of floats are attached, and move relative to one another. A generator according to the present invention is positioned between each float and the kinetic energy of relative movement is converted into electricity.

The types of wave systems may use the present invention, for example ocean floor fixed wave turbines, floating wave turbines, tidal motion wave turbines.

The present invention is also suitable for portable petrol/diesel generators.

Various electric machines according to the present invention will now be described by way of example with reference to the accompanying figures in which:

FIG. 1 is a table showing savings in the materials of the present invention;

Figure 4A:
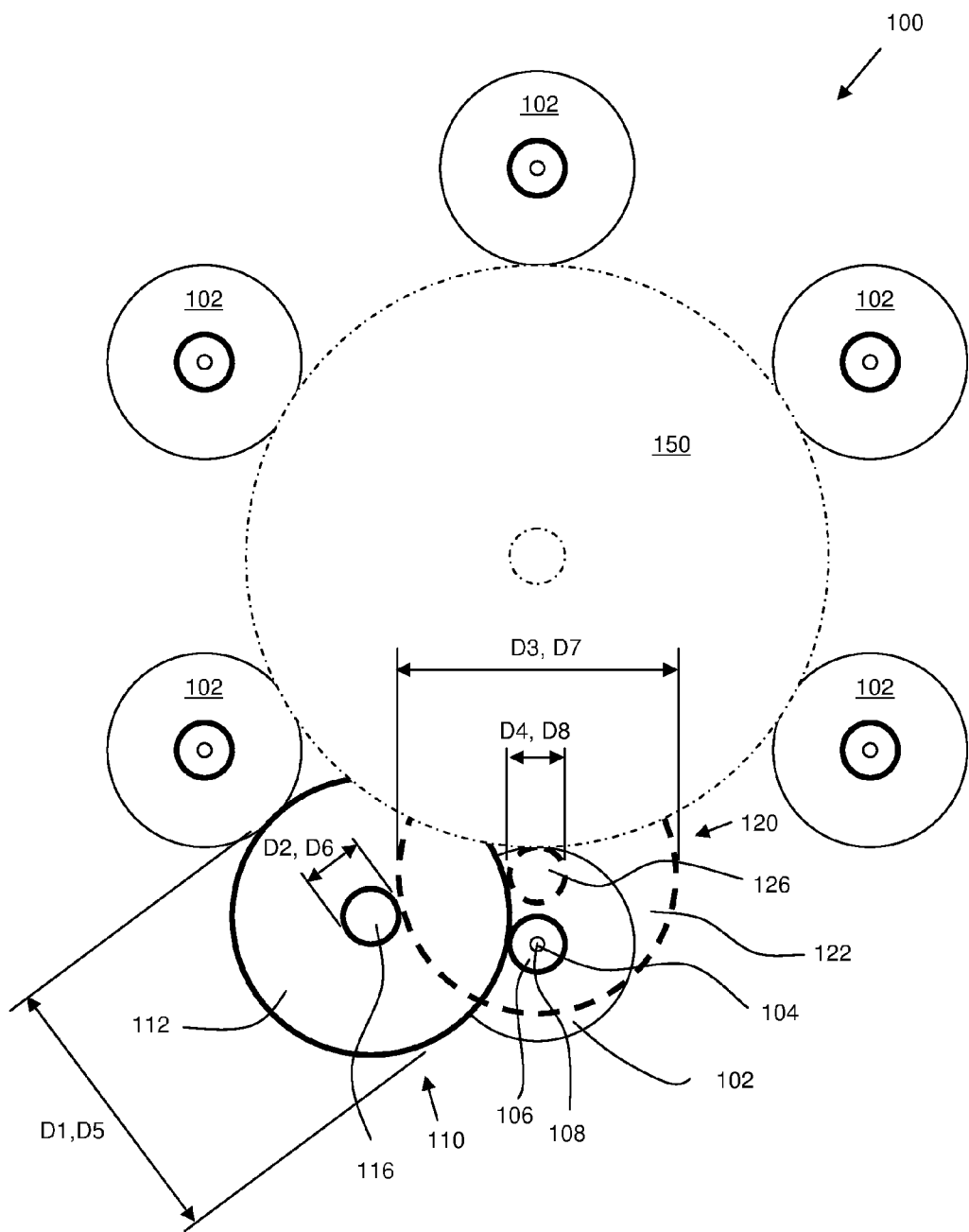
FIG. 4a is a schematic underside view of a part of a first electric machine in accordance with the present invention.

Turning to FIG. 4a, a motor 100 comprises six permanent magnet DC brushed electric sub-motors 102. It will be noted that the following description of the motor 100 applies equally to a generator or a combined motor/generator.

Each electric sub-motor 102 has an output shaft 104 on which a motor output gear 106 is mounted. The output shaft 104 and motor output gear 106 share a motor axis 108 (see FIG. 4c). Parallel to and offset from the motor axis 108, a first gear assembly 110 is provided having an input gear 112 of diameter D1, connected by a shaft 114 to an output gear 116 having a diameter D2. The gears 112, 116 and the shaft 114 are mounted to rotate about a first gear assembly axis 118. A second gear assembly 120 is provided, having an input gear 122 having a diameter D3 connected by a shaft 124 to an output gear 126 having a diameter D4. The gears 122, 126 and the shaft 124 are mounted to rotate about a second gear assembly axis 128.

The third gear assembly 130 is provided comprising an input gear 132 having a diameter D5, connected by a shaft 134 to an output gear 136 having a diameter D6.

The gears 132, 136 and the shaft 134 are mounted to rotate about a third gear assembly axis 138. A fourth gear assembly 140 is provided having an input gear 142 having a diameter D7, connected by a shaft 144 to an output gear 146 having a diameter D8. The gears 142, 146 and shaft 144 are arranged to rotate about a fourth gear assembly axis 148.

The motor 100 comprises a primary output gear 150 connected to an output shaft 152 for rotation about an output axis 154.

In use, the axis 108, 118, 128, 138, 148, 154 are all parallel. The gear assemblies 110, 120, 130, 140 successively form a drive train between the electric sub-motor 102 and the output shaft 152. As such, the motor output gear 106 is engaged for rotation with the input gear 112 of the first gear assembly 110. The output gear 116 of the first gear assembly 110 is engaged for rotation with the input gear 112 of the second gear assembly 120. The output gear 126 of the second gear assembly 120 is engaged for rotation with the input gear 132 of the third gear assembly 130. The output gear of the third gear assembly 130 is engaged for rotation with the input gear 142 of the fourth gear assembly 140. The output gear 146 of the fourth gear assembly 140 is engaged for rotation with the primary output gear 150 of the motor 100.

Due to the fact that each of the input gears 112, 122, 132, 142 each has a larger diameter (D1, D3, D5, D7 respectively) than the output gears 116, 126, 136, 146 (D2, D4, D6, D8 respectively) the gear chain steps down the speed of the electric sub-motor 102 and consequently increases the torque thereof such that the input at the primary output gear 150 is of a relatively low speed and high torque compared to the output shaft 104 of the sub-motor 102.

By making the input gears 112, 122, 132, 142 the same diameter (D1=D3=D5=D7), and the output gears 116, 126, 136, the same diameter (D2=D4=D6) the alternate gear assemblies 110, 130 can be stacked on top of each other and coaxial (i.e. axes 118 and 138 align). Alternate gear assemblies 120, 140 are also stacked and coaxial (i.e. axes 128 and 148 align). This makes the gear train more compact.

Referring back to FIG. 4a, six such assemblies are provided comprising six electric sub-motors 102, equally spaced around the output axis 154 of the motor. As such, each of the output gears 146 of the gear chains engages in a different position around the circumference of the output gear 150 such that the forces applied to the output gear 150 are cumulative across each of the six sub-motors 102.

Figure 4B:
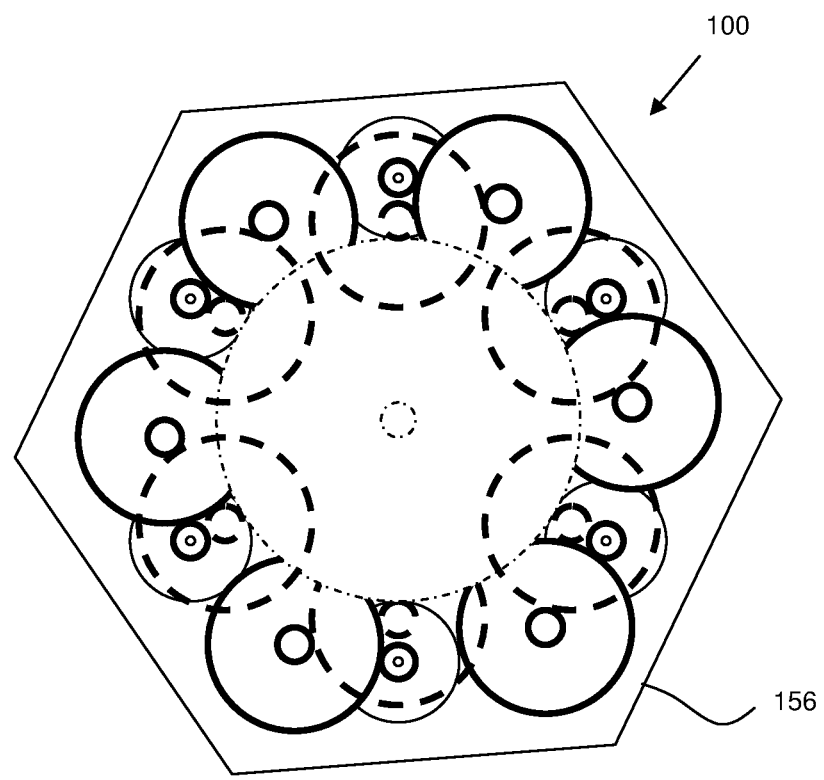
FIG. 4b is an underside schematic view of the electric machine of FIG. 1 showing a casing.
Figure 4C:
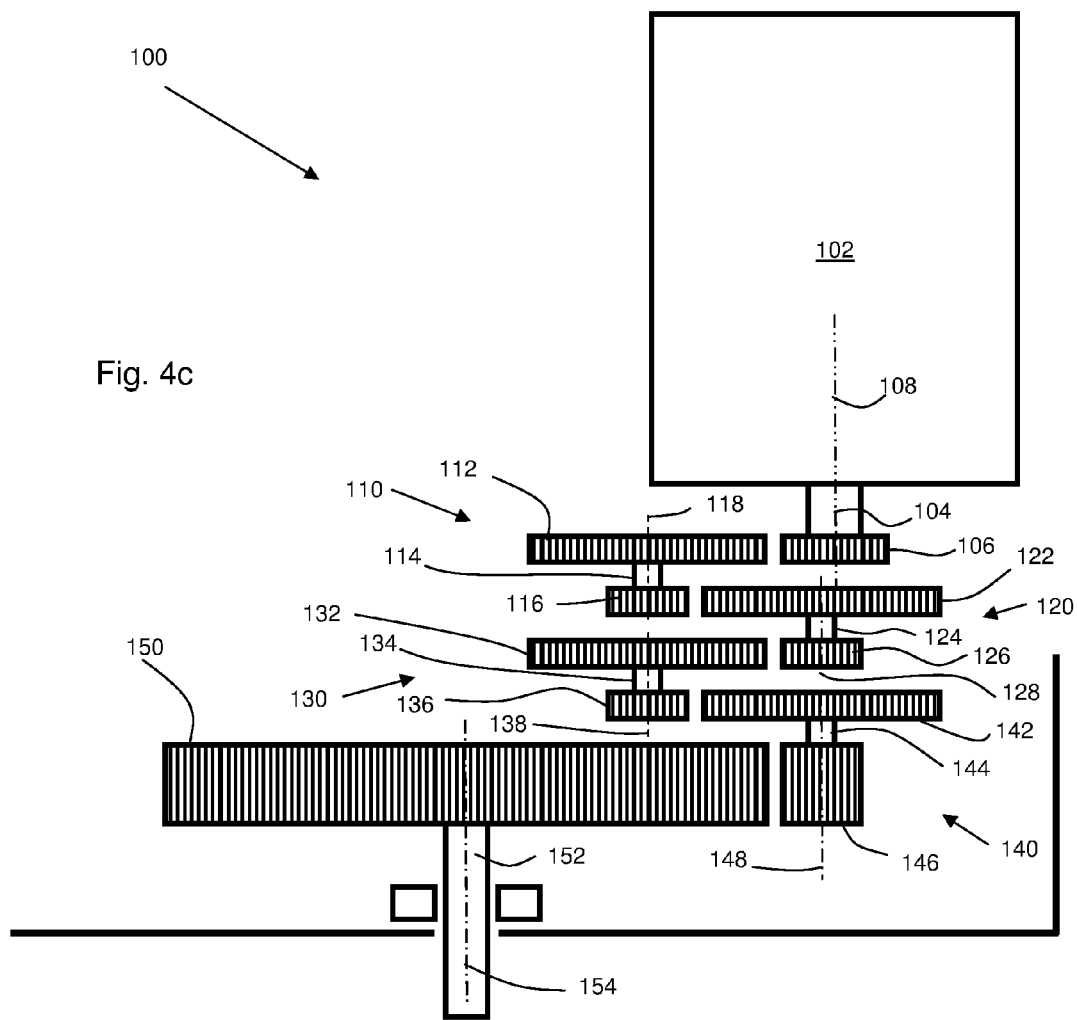
FIG. 4c is a side view of the electric machine of FIG. 1.

Referring to FIG. 4b, the entire assembly is placed within a compact housing 156.

FIGS. 5 to 11 show an alternative architecture for the present invention, which instead of utilising a series of individual motors (which can be obtained "off the shelf"), a custom built motor can be provided in a single housing.

Figure 5:
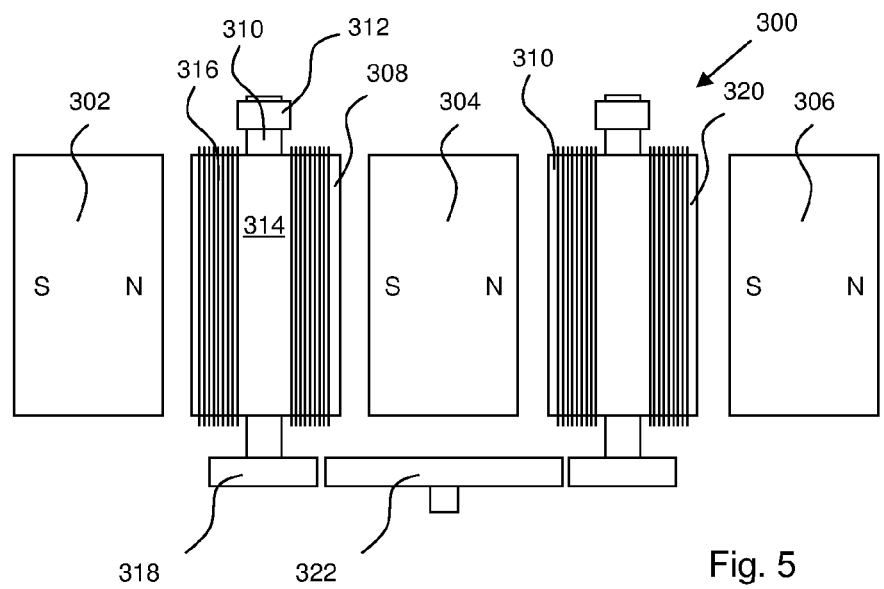
FIG. 5 is a schematic view of a part of a second electric machine in accordance with the present invention.
Figure 6:
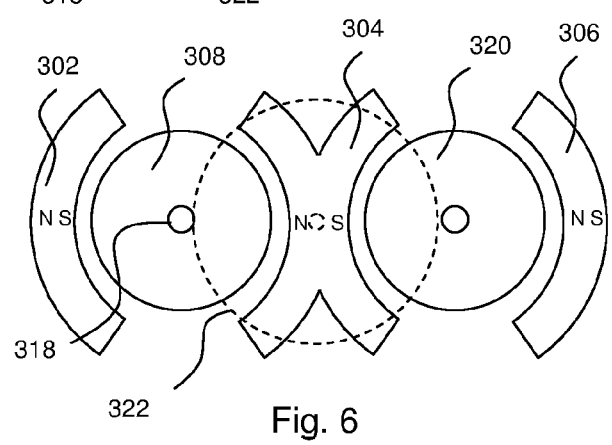
FIG. 6 is a schematic view of a part the electric machine of FIG. 5.

Referring to FIGS. 5 and 6, a motor 300 comprises a first permanent magnet stator 302, a second permanent magnet stator 304 and a third permanent magnet stator 306. Each of the stators is aligned with North-South (NS) orientation the same.

A first electric motor rotor 308 is positioned for rotation between the North and South poles of the first and second stators 302, 304 respectively and comprises a shaft 310, a terminal 312 for connection to an electricity supply (e.g. a commutator in a brushed motor), a core 314 and windings 316. The shaft is connected to an output gear 318.

A second electric motor rotor 320 is positioned between the North and South poles of the second and third stators 304, 306 respectively. It is substantially identical to the first rotor 308.

The output gears 318 of the rotors 308, 320 can be summed with a gear train per the earlier embodiments of the invention. A primary output gear 322 is shown for exemplary purposes, but it will be understood that a gear arrangement with a much higher ratio may be provided.

Figure 7:
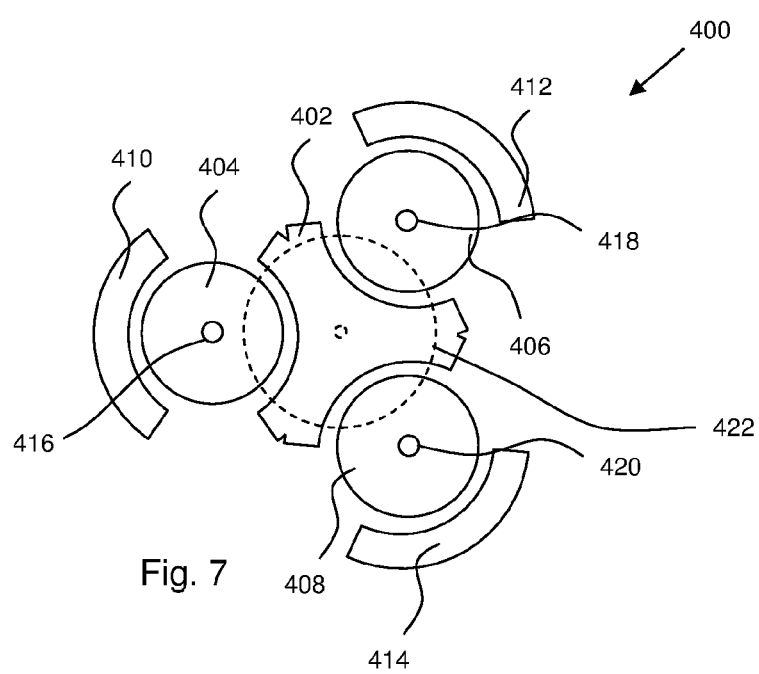
FIG. 7 is a schematic view of a part of a third electric machine in accordance with the present invention.

Turning to FIG. 7, a further example is shown in which a motor 400 comprises a central stator 402 surrounded by a first rotor 404, a second rotor 406 and a third rotor 408. Each rotor is provided with a peripheral stator 410, 412, 414 respectively which has a pole opposite to the outer face of the central stator. Each rotor 404, 406, 408 has an output gear 416, 418, 420 meshed with an example gear train in the form of a primary output gear 422.

Figure 8:
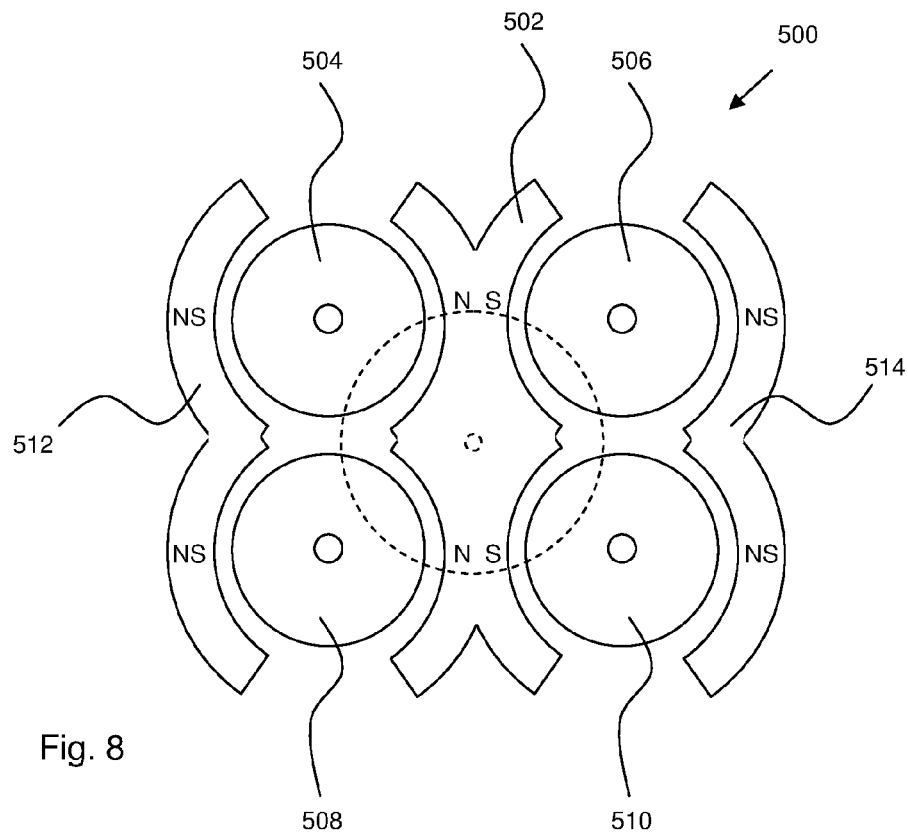
FIG. 8 is a schematic view of a part of a fourth electric machine in accordance with the present invention.
Figure 9:
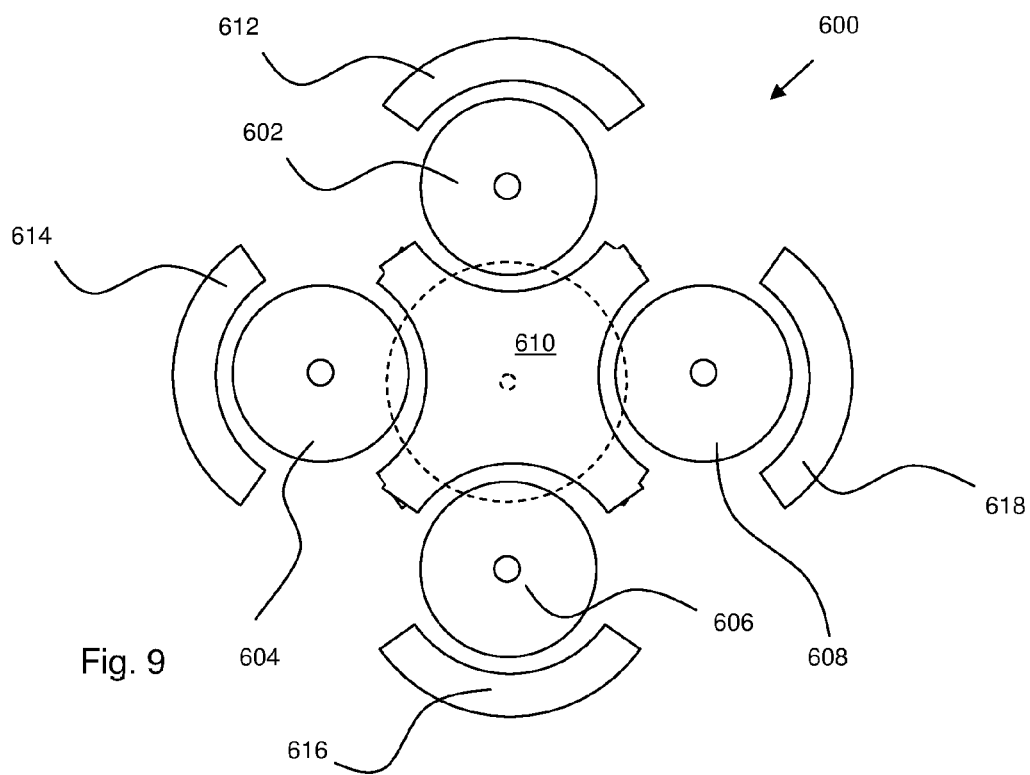
FIG. 9 is a schematic view of a part of a fifth electric machine in accordance with the present invention.

FIGS. 8 and 9 show alternative arrangements for four rotors. The motor 500 of FIG. 8 has a central stator 502 with four rotors 504, 506, 508, 510 positioned in two pairs either side thereof. A first pair of rotors 504, 508 is provided with a first common peripheral stator 512, and a second pair of rotors 506, 510 is provided with a second common peripheral stator 514.

FIG. 9 shows a similar motor 600, but four rotors 602, 604, 606, 608 are evenly spaced at 90 degrees around a common stator 610, and each rotor 602, 604, 606, 608 has its own respective peripheral stator 612, 614, 616, 618 respectively.

Figure 10:
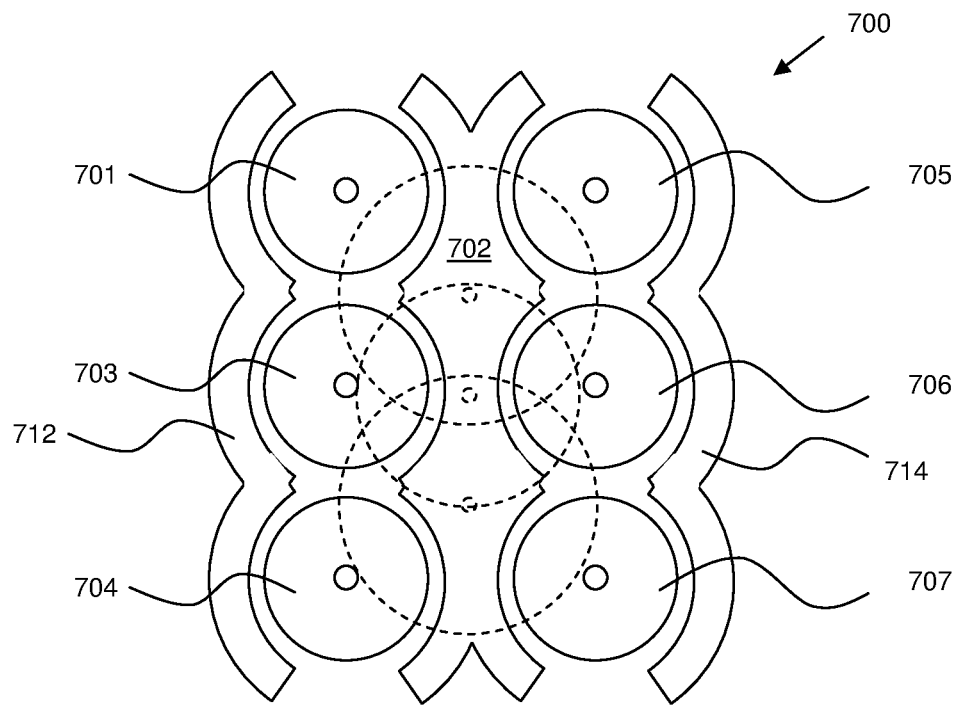
FIG. 10 is a schematic view of a part of a sixth electric machine in accordance with the present invention.
Figure 11:
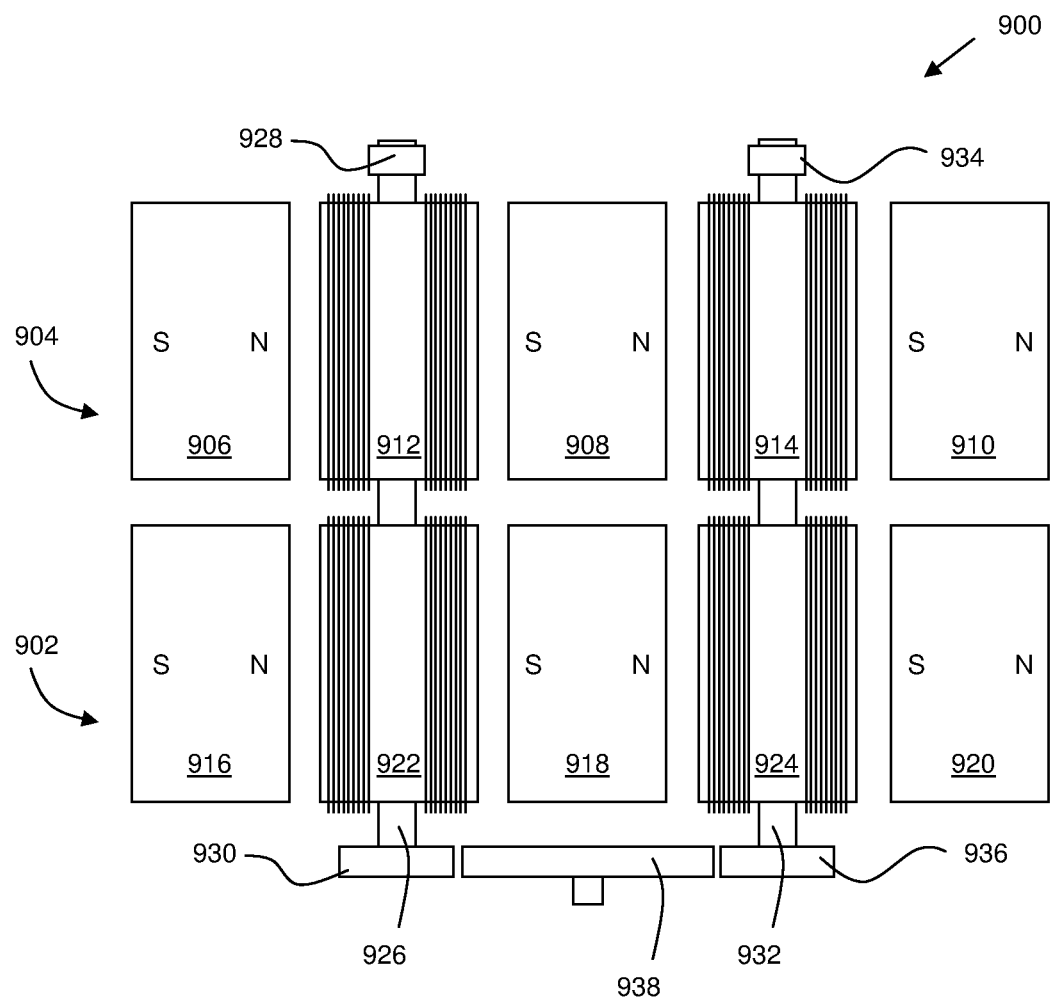
FIG. 11 is a schematic view of a part of an eighth electric machine in accordance with the present invention.

FIGS. 10 and 11 show the equivalent motors to FIGS. 8 and 9 but with six rotors instead of four.

FIGS. 8 and 9 show alternative arrangements for four rotors. The motor 700 of FIG. 8 has a central stator 702 with six rotors 701, 703, 704, 705, 706, 707 positioned in two sets of three either side thereof. A first set of rotors 701, 703, 704 is provided with a first common peripheral stator 712, and a second set of rotors 705, 706, 707 is provided with a second common peripheral stator 714.

Figure 10A:
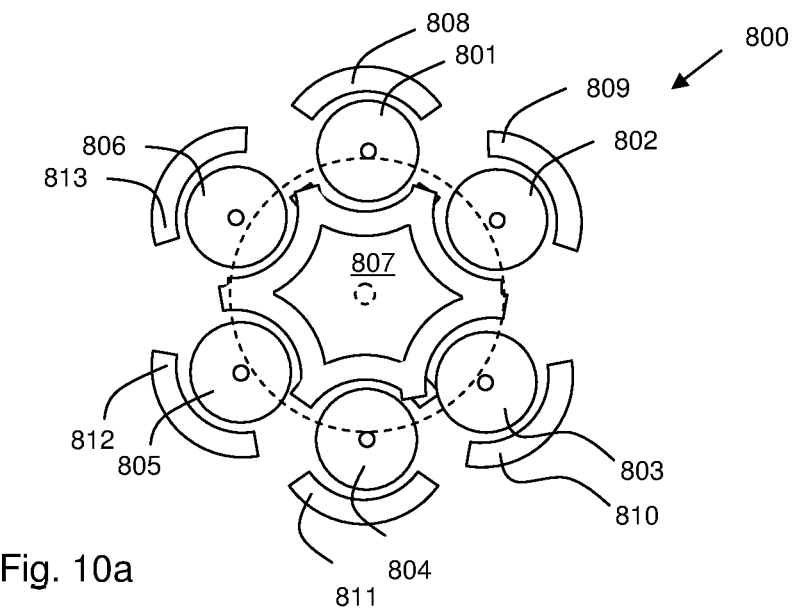
FIG. 10a is a schematic view of a part of a seventh electric machine in accordance with the present invention.

FIG. 10a shows a similar motor 800 to the motor 700, but six rotors 801, 802, 803, 804, 805, 806 are evenly spaced at 60 degrees around a common stator 807, and each rotor 801, 802, 803, 804, 805, 806 has its own respective peripheral stator 808, 809, 810, 811, 812, 813 respectively.

Turning to FIG. 11, a two-layer motor 900 is shown having a first layer 902 and a second layer 904, each equivalent to the motor 300. The first layer 902 has a first, second an third stator 906, 908, 910 with two rotors 912, 914 interspersed therebetween. Similarly the second layer 904 has a first, second an third stator 916, 918, 920 with two rotors 922, 924 interspersed therebetween.

The rotors 912, 922 are mounted on a common shaft 926 having a multiple commutator 928 at a first end, and an output gear 930 at a second end. Similarly, the rotors 914, 924 are mounted on a common shaft 932 having a multiple commutator 934 at a first end, and an output gear 934 at a second end.

The gears 930, 936 are engaged with a primary output gear 938.

In the example of FIG. 11, the shafts 926, 932 are integral, although the rotors on each shaft may be arranged to rotate relative to one another, or even counter rotate (by appropriately reversing the rotor windings or stator magnetic orientation) to provide a balancing effect.

Advantageously, stacking the rotor sets reduces the number of gears and commutators for a given motor assembly. Further layers can be added if required, such that the motor shape can be constructed to fill the packaging space available.

Figure 12:
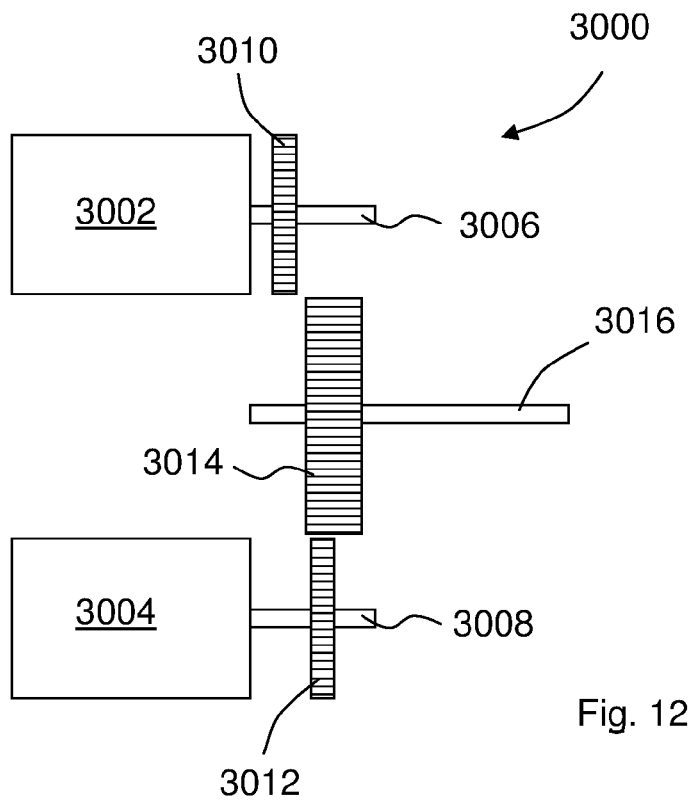
FIG. 12 is a schematic view of a ninth electric machine in accordance with the present invention.
Figure 13:
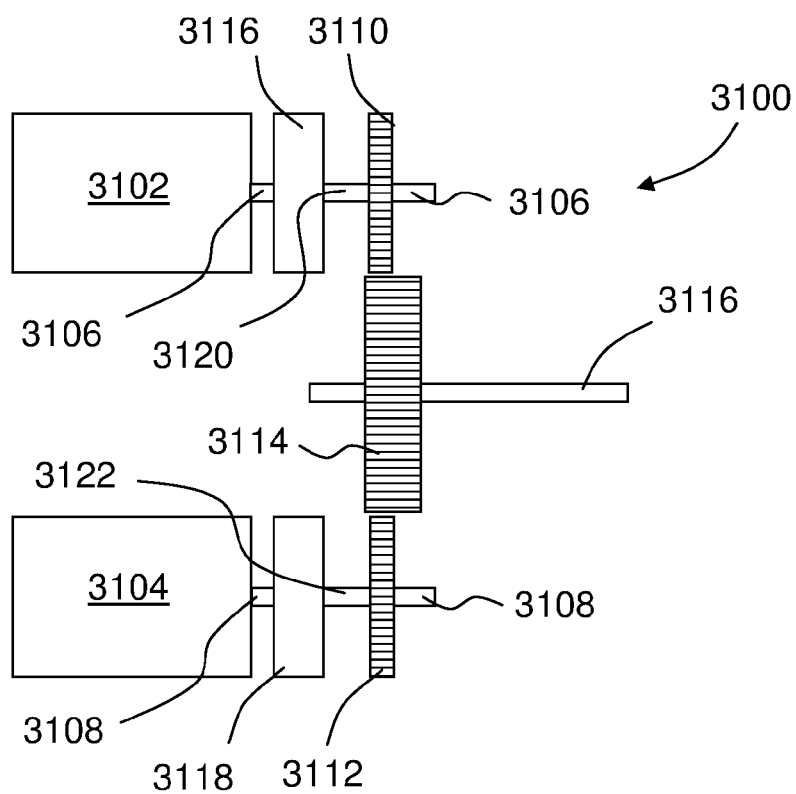
FIG. 13 is a schematic view of a tenth electric machine in accordance with the present invention.
Figure 14:
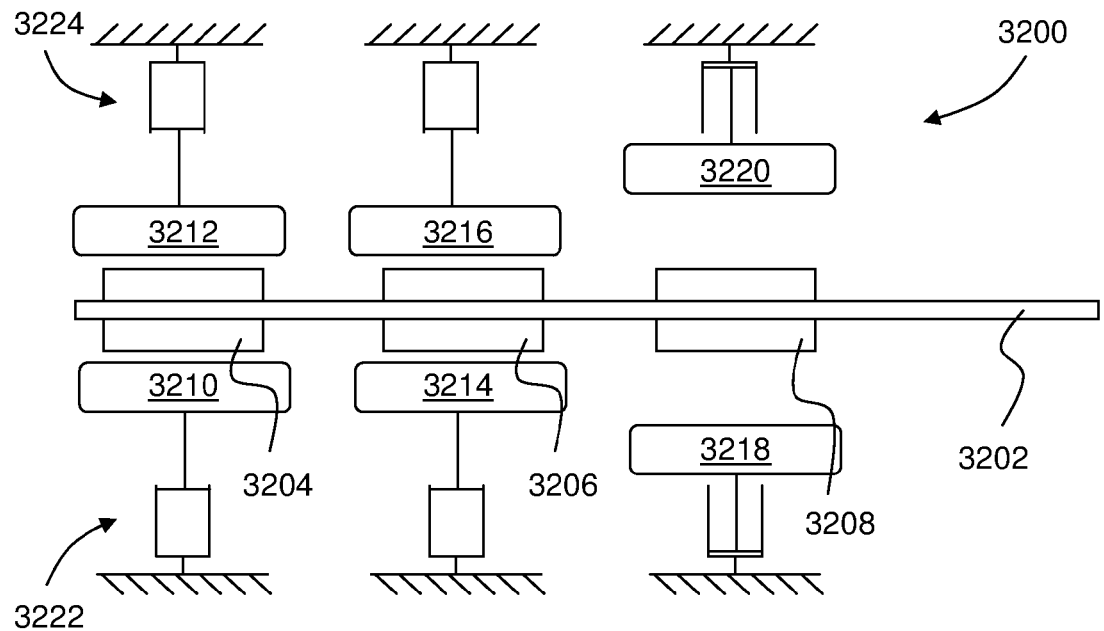
FIG. 14 is a schematic view of an eleventh electric machine in accordance with the present invention.

FIGS. 12 to 14 show various methods for engaging and disengaging the sub-motors or sub-generators. Each will be described with reference to a motor, but it will be appreciated that the apparatus and method described is equally applicable to generators. The general apparatus and methods of FIGS. 12 to 14 are applicable to each of the above-described electric machines.

Turning to FIG. 12, a composite motor 3000 comprises a first and second sub-motor 3002, 3004 respectively. Two sub-motors 3002, 3004 are shown for simplicity, but further sub-motors may be present in accordance with the above-described embodiments.

Each motor 3002, 3004 has a respective output shaft 3006, 3008, with a respective output gear 3010, 3012. The gears 3010, 3012 are axially slidable on the shafts 3006, 3008 but rotationally fixed therewith (e.g. by a spline).

The gears 3010, 3012 are meshed with a primary output gear 3014, which in turn drives a primary output shaft 3016. The motor 3000 comprises an actuation system for moving the gears 3010, 3012 axially along the shafts 3006, 3008 into and out of engagement with the primary output gear 3014 in accordance with the operating principles described below.

Turning to FIG. 13, a composite motor 3100 comprises a first and second sub-motor 3102, 3104 respectively. Two sub-motors 3102, 3104 are shown for simplicity, but further sub-motors may be present in accordance with the above-described embodiments.

Each motor 3102, 3104 has a respective output shaft 3106, 3108. A clutch 3116, 3118 is provided on each shaft 3106, 3108 to selectively interrupt transmission. Each clutch has an output shaft 3120, 3122 with a respective output gear 3010, 3012.

The gears 3010, 3012 are meshed with a primary output gear 3014, which in turn drives a primary output shaft 3016. The clutches 3116, 3118 can therefore be used to selectively engage and disengage the motors 3102, 3104 from driving the primary output shaft 3116.

A further composite motor 3200 is shown in FIG. 14. The motor 3200 comprises a primary output shaft 3202 having a first second and third permanent magnet rotor 3204, 3206, 3208.

The first rotor 3204 is provided with a first stator part 3210 and a second stator part 3212. The second rotor 3206 is provided with a third stator part 3214 and a fourth stator part 3216. The third rotor 3208 is provided with a fifth stator part 3218 and a sixth stator part 3220.

Each respective pair of stators is provided as an electromagnet, thus forming three brushless motors on the shaft 3202.

The stator pairs are mounted to actuation assemblies—e.g. assemblies 3222 and 3224. The actuation assemblies can retract and deploy the stator pairs to take them away from, or closer to, the rotor 3204. As such, each sub-motor can be disengaged.

It will be noted that each sub-rotor could be disengaged by disconnecting the power supply to the stator. Although this would provide some limited functionality, the rotor magnet would establish an alternating current in the stator coils, and thus would experience some resistance, which is undesirable. Taking the stators away from the magnetic field of the rotor mitigates this effect.

Figure 15:
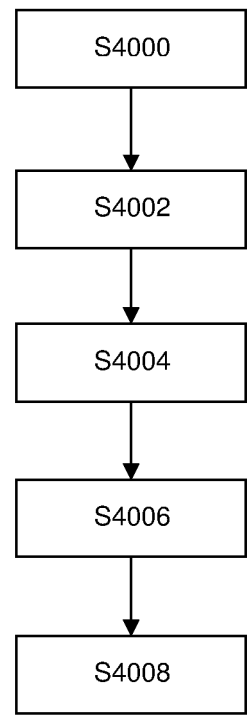
FIG. 15 is a flowchart of a design process for the present invention.

A composite electric machine in accordance with FIGS. 12 to 14 is designed in accordance with FIG. 15.

Firstly, the power requirement, Preq, of the composite machine is established at step S4000. This is usually the maximum mechanical power which is likely to be delivered by a composite motor, or the maximum electrical power which is likely to be delivered by a composite generator.

At step S4002, the number of sub-machines, N, is chosen (for example 6).

Figure 2:
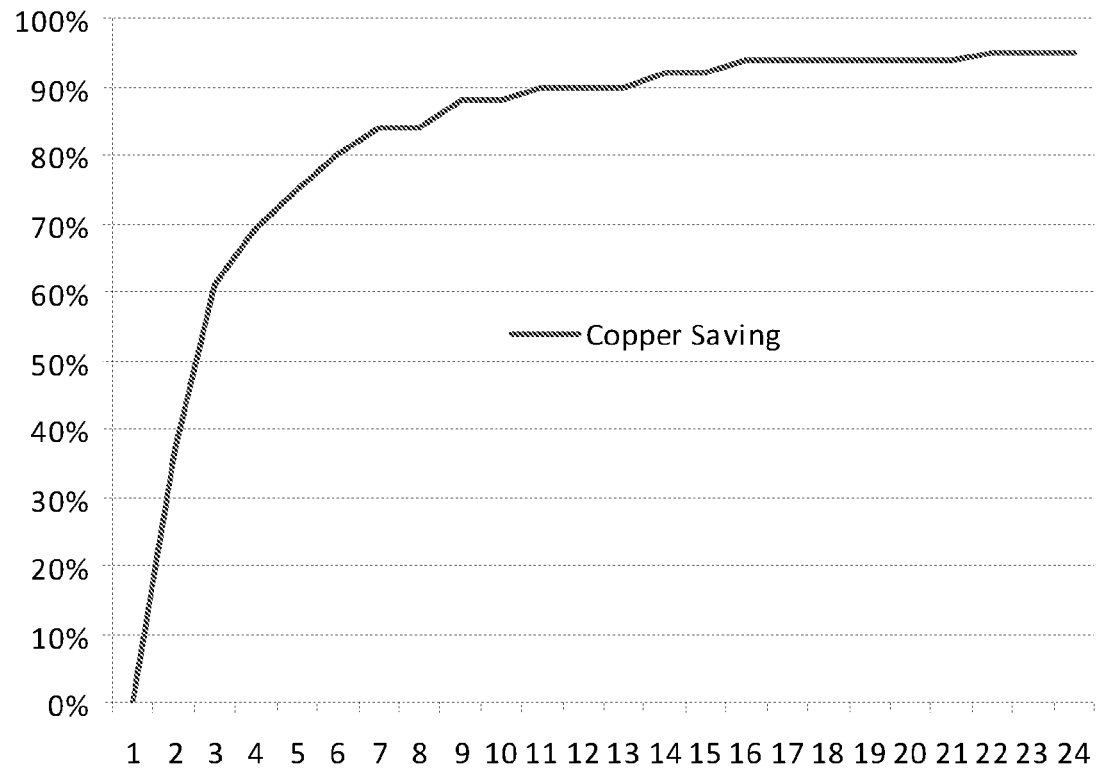
FIG. 2 is a graph of a statistic from FIG. 1.
Figure 3A:
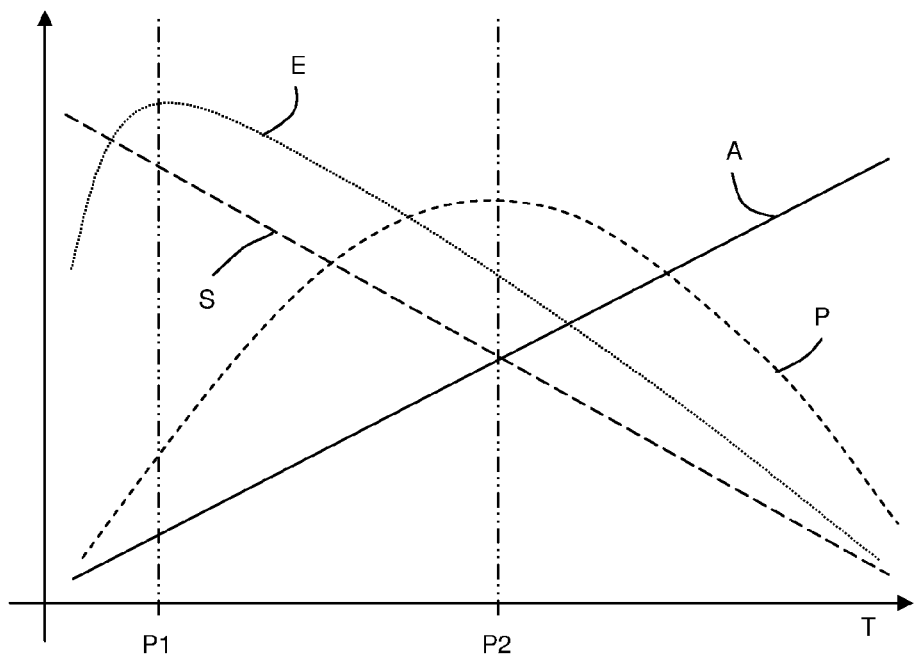
FIGS. 3a to 3c are motor performance graphs.
Figure 3B:
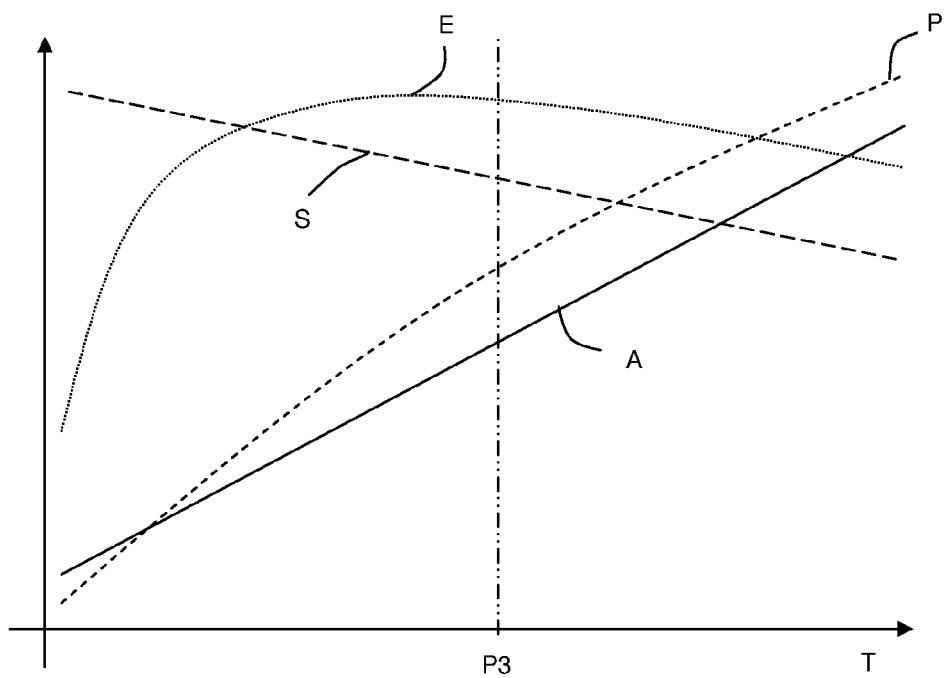

At step S4004, n identical electric machines are specified. Individual machines are typically rated at their maximum power output (which with reference to FIG. 3a is not at their maximum efficiency). Instead of using n machines each having maximum power Preq/N, according to the invention the machines are over specified. That is, each sub-machine is chosen to provide power Preq at peak efficiency—that is operating in the region of P1 in FIG. 3a. It will be noted that the peak power of each sub-machine will exceed Preq/N by a factor of at least three.

Ideally, each machine will be specified such that operating at Preq/2N, it its operating at maximum efficiency to ensure that each motor has an operating range spanning the maximum efficiency.

At step S4008, the controller parameters are specified (control will be discussed in more detail below). The controller is connected to a sensor measuring a parameter indicative of the operating power of the machine. It is configured to engage 1 electric machine from zero power to Preq/N, two machines at 2*Preq/N, three machines at 3*Preq/N and so on until n=N machines at power Preq.

The invention also provides a controller and method of operating a composite electric machine which is configured to allow selective disengagement of its constituent sub-motors.

Figure 16:
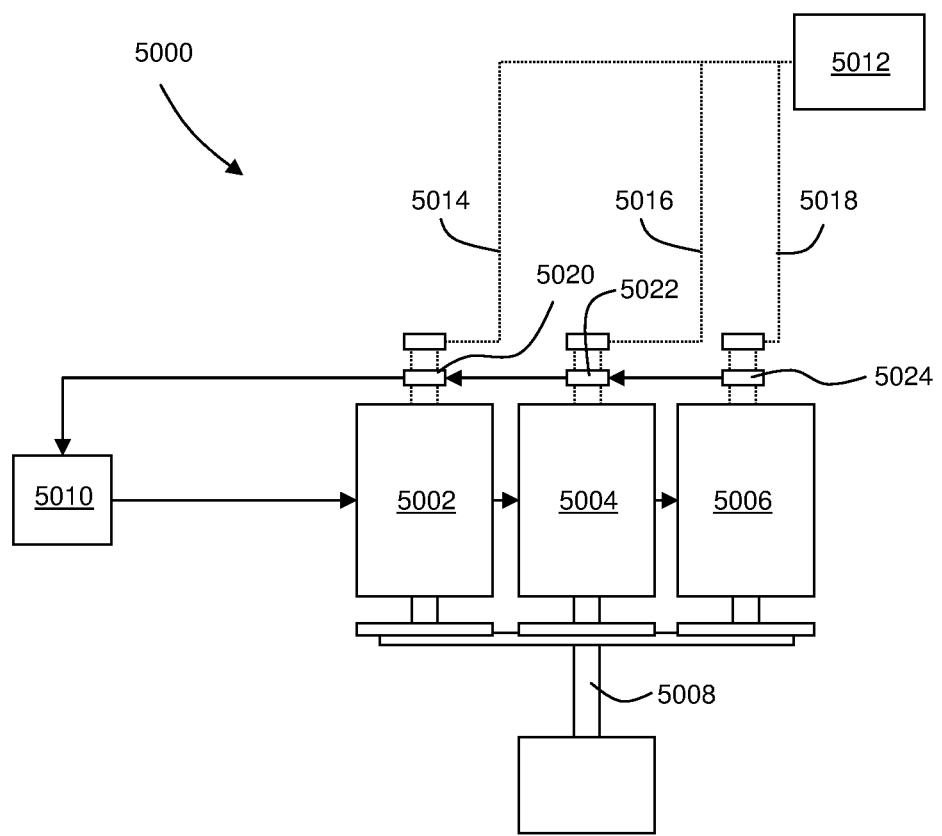
FIG. 16 is a schematic of a control system for an electric machine in accordance with the present invention.

A composite electric machine 5000 comprising a controller according to the present invention is shown in FIG. 16.

The machine 5000 comprises three sub-machines 5002, 5004, 5004 driving, or being driven by (depending on whether the machine 5000 is a motor or generator) a primary shaft 5008 as described above.

Each sub-machine can be individually and selectively disengaged from the shaft 5008 by a controller 5010. The controller 5010 may, for example, be configured to disengage a clutch in the sub-machines 5002, 5004, 5006.

Each sub-machine 5002, 5004, 5006 is connected to an electrical power storage unit 5012 by power lines 5014, 5016, 5018. Electrical power sensors 5020, 5022, 5024 are positioned in the power lines to measure the electrical power being converted by each sub-machine 5002, 5004, 5006 respectively. Each sensor feeds back to the controller 5010.

Figure 3C:
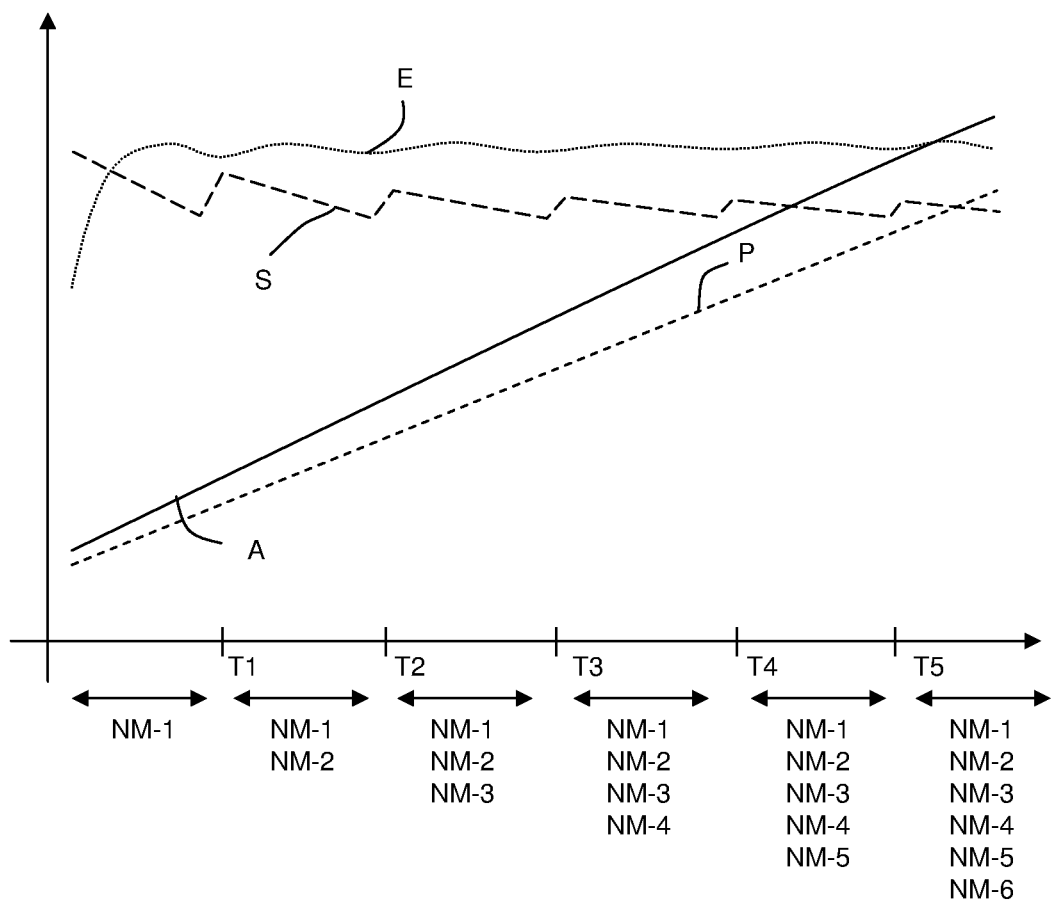

In use, the controller 5010 can thereby monitor the electrical power being converted by the composite machine 5000, and engage the required sub-machined in order to maintain high efficiency in accordance with FIG. 3c.

The controller 5010, which comprises control software running on a CPU with an associated memotry, does not always engage the same sub-machines in the same order. In one embodiment, the controller 5010 will engage alternate sub-machines as the first sub-machine. For example in the first use of the machine 5000, sub-machine 5002 may be engaged first, later supplemented by machines 5004, 5006.

In another embodiment, the controller 5010 retains a work history for each sub-machine on its memory. The controller will select the next sub-machine to be engaged depending on its work history, in order to encourage even use of all sub-machines. The sub-machine with the least use will be engaged next.

The controller 5010 does not always disengage the sub-machines in order. Instead, if the controller 5010 needs to disengage a sub-machine based on a drop in machine power, it will disengage the sub-machine with the highest use.

The above described electric machines can be used in a variety of applications.

Figure 17:
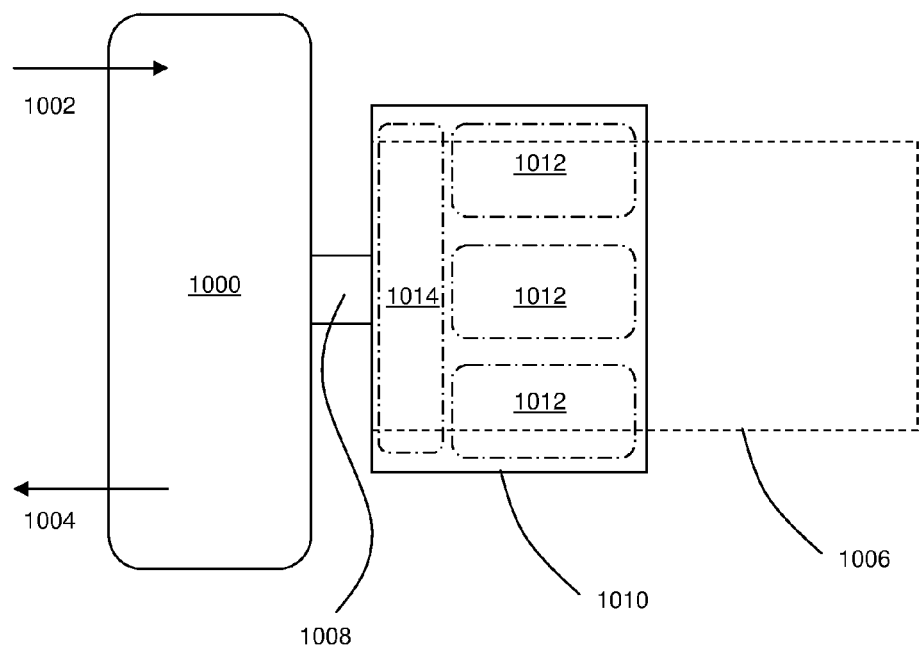
FIG. 17 is a schematic view of a pump assembly comprising a motor according to the present invention.

The application of the invention to a motor is particularly well suited to drive pumps in various applications. For positive displacement pumps such as gear pumps, gerotor pumps and the like, prior art motors tend to project from the rear of the pump housing. As shown in FIG. 17, a positive displacement pump 1000 such as a gerotor has an inlet 1002 and an outlet 1004. A prior art motor 1006 (shown in hidden line) drives the pump through an input shaft 1008.

A motor 1010 according to the present invention is provided in place of the prior art motor, comprising a plurality of sub-motors 1012 connected to a gearbox 1014 which in turn drives the shaft 1008.

As can be seen, the provision of a motor according to the present invention provides a more compact arrangement. Because a number of smaller sub-motors are used, the system can be shorter and wider, which often better matches the footprint of the pump in use. Furthermore, the motor according to the present invention is more reliable because if one motor were to fail, the remaining motors would carry on.

This is equally applicable to impeller-type pumps such as axial flow or centrifugal pumps.

In situations where it is beneficial to reduce the axial length of an assembly, the present invention is particularly well suited. For example, in a domestic washing machine or tumble dryer it is beneficial to use as much axial space as possible for the drum.

Figure 18:
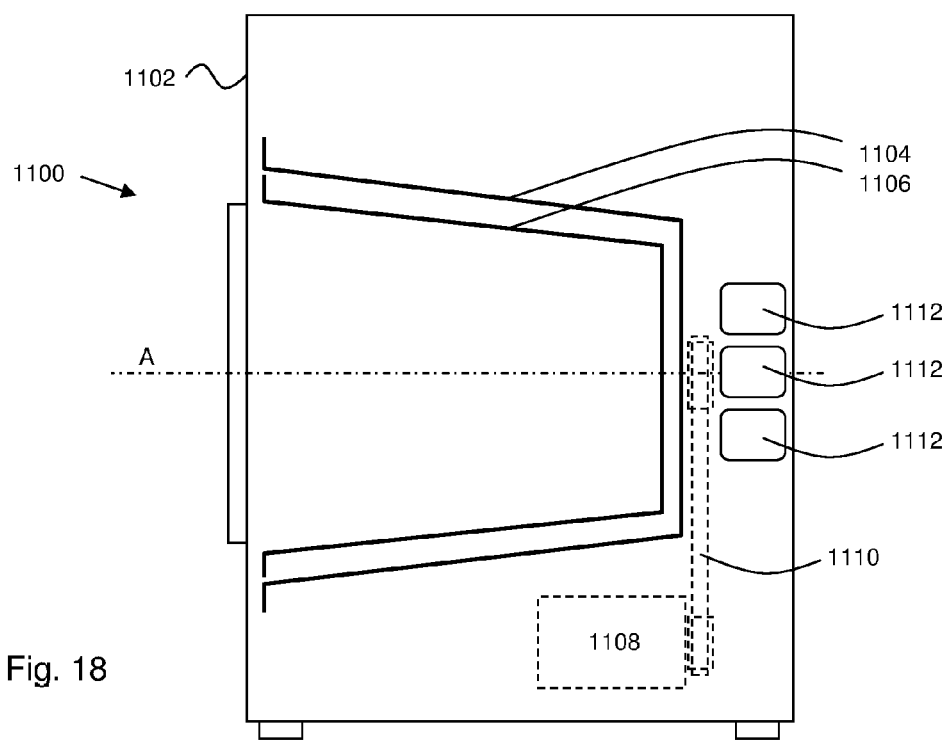
FIG. 18 is a schematic view of a washing machine comprising a motor according to the present invention.

Referring to FIG. 18 a washing machine 1100 generally comprises a housing 1102 containing a stationary drum 1104 containing a rotating drum 1106 used to agitate and spin clothing during the washing cycle by rotating about an axis A.

In known machines, it is desirable to provide a drum 1106 which is as deep as possible to increase the load capacity. As such, known motors such as a motor 1108 as shown in FIG. 18 are offset from the axis A and connected by a belt drive 1100. This is because the motor 1108 has to be large in order to provide the required torque and speed to spin the drum 1106.

A further problem with this arrangement is that the motor 1108 is off-centre and as such vibrations can occur which requires mass damping within the housing 1102. This makes the unit heavy and cumbersome.

A series of six sub-motors 1112 is provided according to the present invention, and shown schematically in FIG. 18. It will be understood that a gearbox will be required between the sub-motors 1112 and the drum 1106, but it can be seen that the present invention can be positioned about the rotation axis A whilst leaving sufficient space for the drum 1106.

This reduces the vibration caused by the offset mass of the motor 1108, reducing the need for damping. It also provides a quieter and more efficient product as the belt drive can be eliminated. It also allows the unit to be made more compact (if required).

Figure 19:
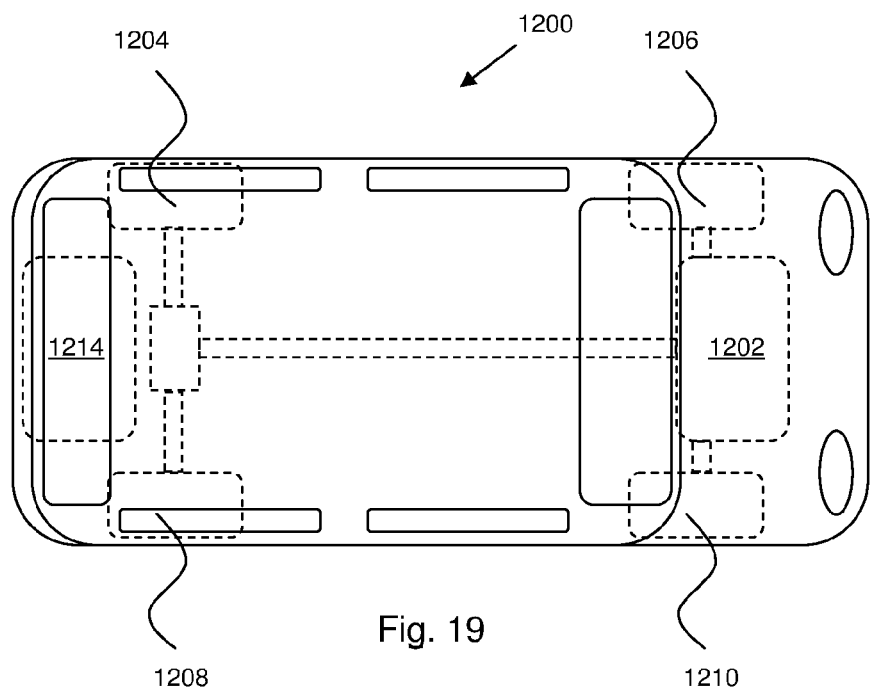
FIG. 19 is a schematic view of a car comprising a motor according to the present invention.

Turning to FIG. 19, a hybrid car 1200 is shown having an internal combustion engine 1202 which drives wheels 1204, 1206, 1208, 1210. An example wheel 1204 is shown in FIG. 20 driven by a shaft 1212 from the engine 1202.

As described, the car 1200 is a hybrid, and can be driven using power from a battery 1214. The battery 1214 is connected to a wheel motor 1216 comprising six individual motor cores 1218 and a gearbox 1220 which engages with the shaft 1212. The motor 1216 is configured in accordance with the present invention and the six motors provide a combined drive to the shaft 1212 to rotate the wheel 1204.

It will be noted that as a hybrid, when the shaft 1212 is driven by the engine 1202, the motor 1216 can be back driven to power and charge the battery 1214.

Figure 20:
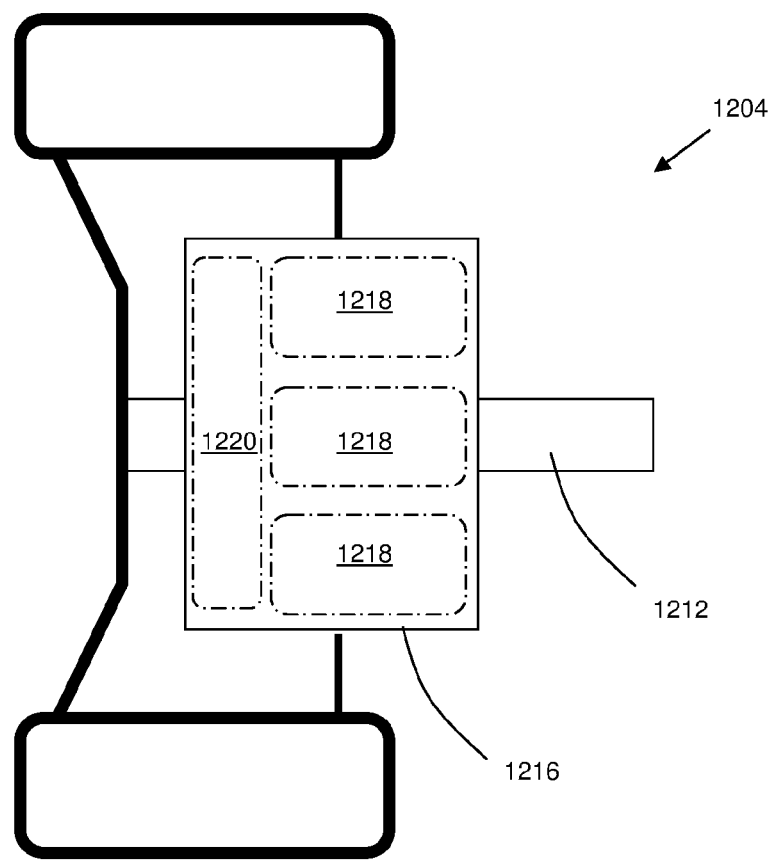
FIG. 20 is a schematic view of a part of the car of FIG. 19.

As can be seen in FIG. 20, the individual sub-motors 1218 can be positioned around the shaft 1212 and even within the wheel 1204 to provide a very compact arrangement which has minimum impact on vehicle packaging space.

The application of the invention to generators also has many uses.

Figure 21:
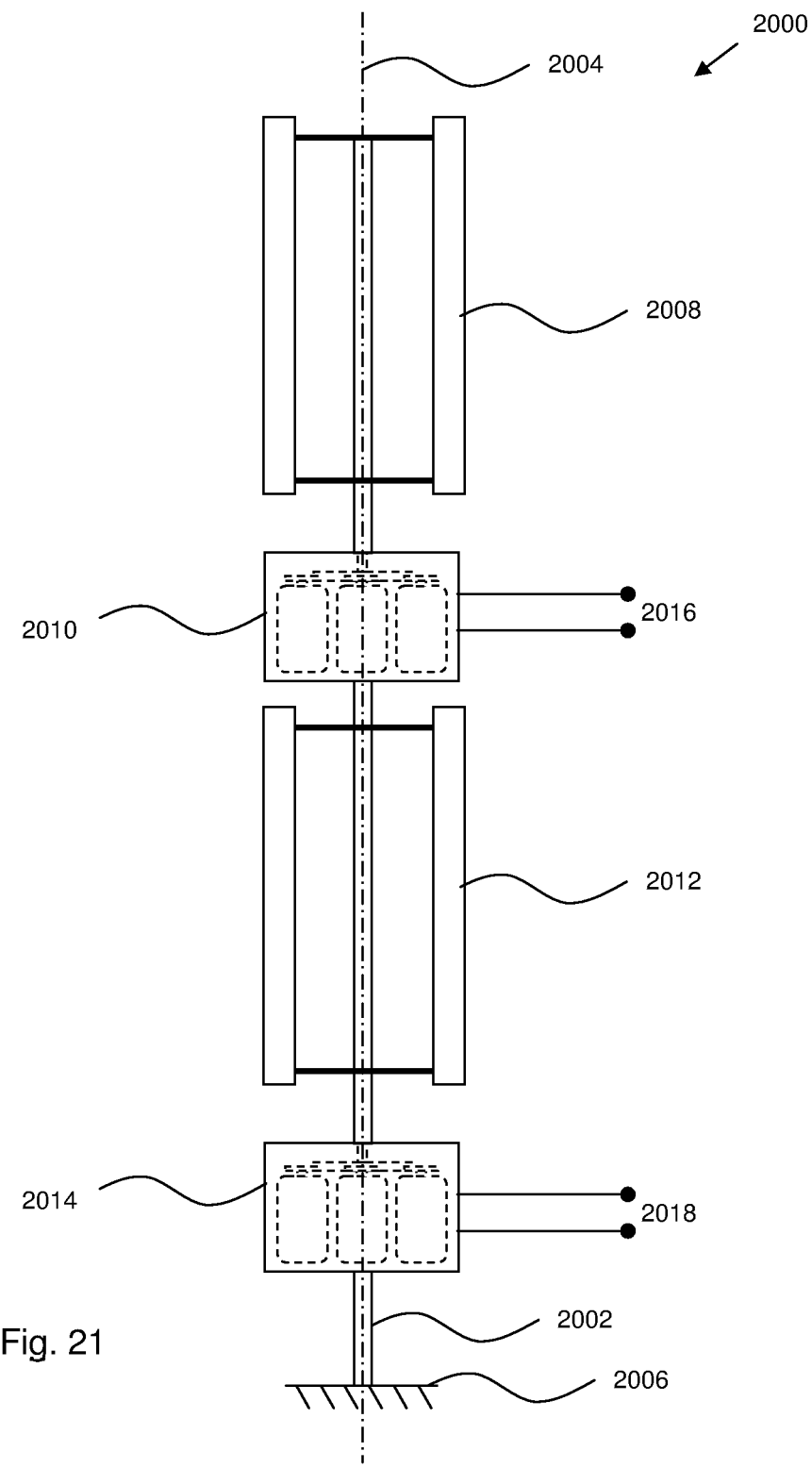
FIG. 21 is a schematic view of a vertical axis wind turbine (VAWT) employing a generator according to the present invention; and, FIG. 22 is a schematic view of a horizontal axis wind turbine (HAWT) employing a generator according to the present invention.

Turning to FIG. 21, a vertical axis wind turbine (VAWT) 2000 is shown. The VAWT comprises a structural shaft 2002 centred on a vertical axis 2004. The shaft 2002 is mounted to a mounting position 2006 which may be on the roof of a building.

A first blade assembly 2008 is provided mounted on the shaft 2002 for rotation about the axis 2004. The first blade assembly 2008 is connected to drive an input gear of a first generator 2010 according to the present invention.

A second blade assembly 2012 is provided mounted on the shaft 2002 for rotation about the axis 2004. The second blade assembly 2012 is connected to drive an input gear of a second generator 2014 according to the present invention.

Both generators 2010, 2014 have electrical outputs 2016, 2018 respectively.

The blade assemblies 2008, 2012 are arranged to contra-rotate on the shaft 2002; that is to rotate in different directions. This allows a more even load distribution to the mounting position 1006.

Figure 22:
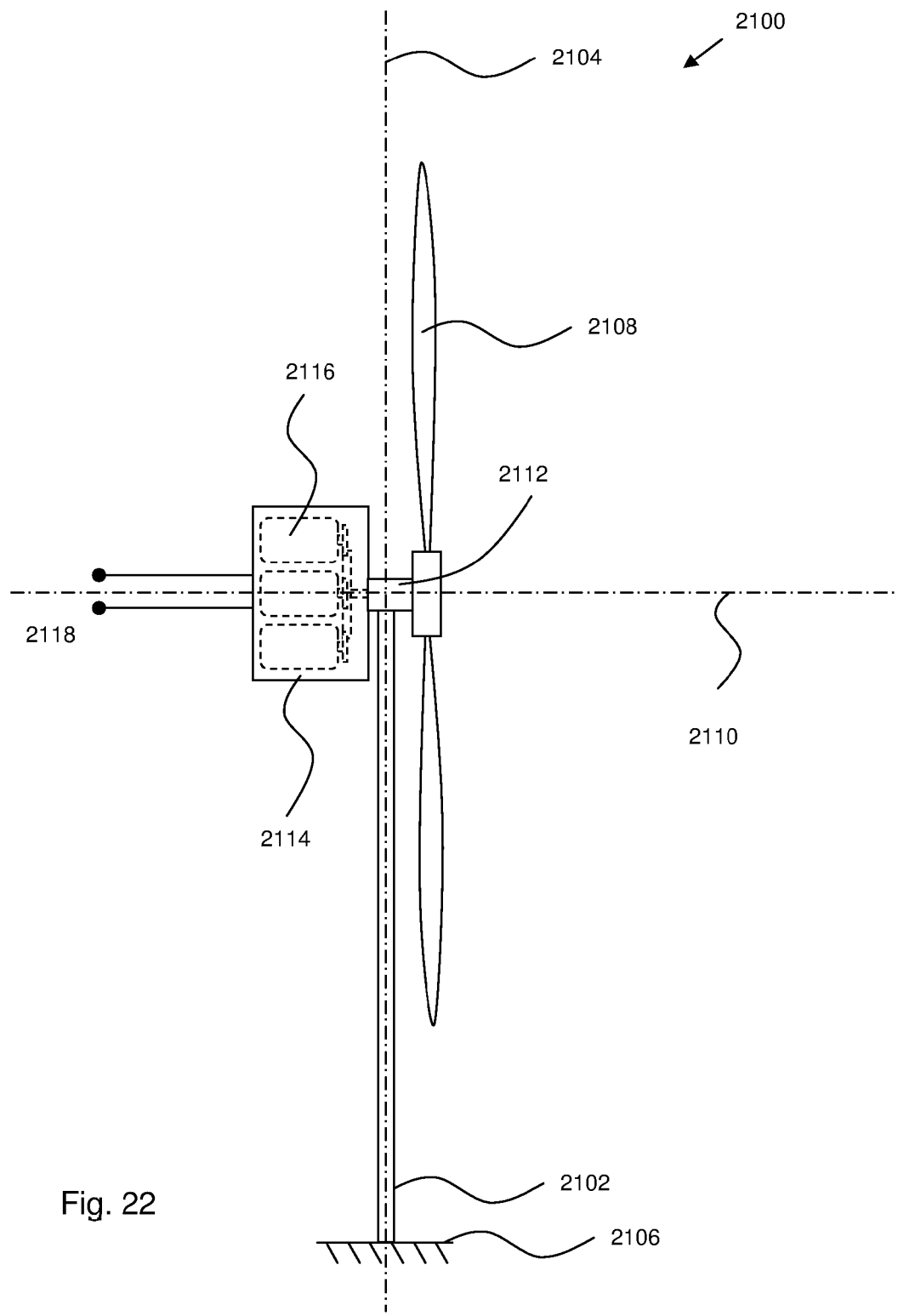

Turning to FIG. 22, a horizontal axis wind turbine (HAWT) 2100 is shown. The HAWT comprises a structural shaft 2102 centred on a vertical axis 2104. The shaft 2102 is mounted to a mounting position 2106 which may be on the roof of a building.

A blade assembly 2108 is provided, and arranged to rotate about a blade axis 2110, driving a shaft 2112. The shaft 2112 acts as an input drive to a generator 2114 in accordance with the present invention, in which each sub-generator 2116 is spaced around the shaft axis 2110.

The generator 2114 has an electrical output 2118.

Variations of the above embodiment are possible within the scope of the present invention.

In the actuator of FIG. 11, each pair of stators 906, 916; 908,918; 910, 920 could be formed as single stator magnets. In this case, the combined stator in place of stators 906, 916 would serve rotors 912, 922, the combined stator in place of stators 908, 918 would serve all four rotors, and the combined stator in place of stators 910, 920 would serve rotors 914, 924. This means that only three stators would be required for four rotors.

In a still further alternative embodiment, a plurality of rotors could be positioned on a single shaft, each of the rotors being served by a pair of magnets extending the length of the motor. This would result in a long, thin motor arrangement.

Other variations include stacking a further layer of motor and gear train assemblies onto the motor described above to further increase the output torque.

The invention claimed is:

1. An electric machine comprising:
a primary mechanical output or input;
a plurality of electric sub-machines configured to selectively drive, or be driven by, the primary mechanical output or input respectively;
a controller configured to:
monitor a parameter of the electric machine indicative of the power of the electric machine;
engage or disengage one or more of the plurality of electric sub-machines dependent upon the monitored parameter, so as to increase the number of sub-machines simultaneously driving, or being driven by, the primary mechanical output or input respectively at higher electric machine powers; and
engage a further sub-machine of the plurality of sub-machines at a power interval; and
engage a further sub-machine of the plurality of sub-machines at a power interval, in which each sub-machine has a maximum rated power of at least three times the power interval.

2. An electric machine according to claim 1 in which each of the sub-machines comprises a rotor, and in which each rotor is configured to be mechanically disengaged from the mechanical input or output to disengage the respective sub-machine.

3. An electric machine according to claim 2 in which each rotor is connected to the input or output shaft by a clutch.

4. An electric machine according to claim 1 in which each of the sub-machines is configured to be selectively electrically disengaged.

5. An electric machine according to claim 1 in which each of the sub-machines comprises a rotor and a stator, in which at least one of the rotor and stator can be moved to reduce their electromagnetic interaction upon disengagement.

6. An electric machine according to claim 1, in which the monitored parameter is representative of electrical power consumed or generated.

7. An electric machine according to claim 1 in which the controller is configured to store sub-machine usage information, engage and disengage each sub-machine based on the sub-machine usage information.

8. An electric machine according to claim 7 in which the controller is configured to engage sub-machines with lowest usage first.

9. An electric machine according to claim 7 in which the controller is configured to disengage sub-machines with highest usage first.

10. A method of operating an electric machine, comprising the steps of:
providing an electric machine having a primary output or input and comprising a plurality of electric sub-machines configured to selectively drive, or be driven by, the primary mechanical output or input respectively;
monitoring a parameter of the electric machine indicative of the power of the electric machine; and,
engaging or disengaging one or more of the plurality of electric sub-machines dependent upon the monitored parameter, so as to increase the number of sub-machines simultaneously driving, or being driven by, the primary mechanical output or input respectively at higher electric machine powers;
engaging a first sub-machine at a first electric machine power;
engaging a second sub-machine at a second electric machine power, the second sub-machine power being a power interval greater than the first power;
in which the power interval is less than one third the rated power of the second sub-machine.

11. A method of operating an electric machine according to claim 10 in which the step of engaging or disengaging one of the sub-machines comprises the step of mechanically engaging or disengaging one of the sub-machines.

12. A method of operating an electric machine according to claim 10 in which the step of engaging or disengaging one of the sub-machines comprises the step of electrically engaging or disengaging one of the sub-machines.

13. A method of operating an electric machine according to claim 10 in which the step of engaging or disengaging one of the sub-machines comprises the step of at least partially magnetically engaging or disengaging a respective rotor and stator one of the sub-machines.

14. A method of operating an electric machine according to claim 10 in which the monitored parameter is representative of electrical power consumed or produced by each sub-machine.

15. A method of operating an electric machine according to claim 10 comprising the steps of:
electronically storing sub-machine usage information;
selecting a sub-machine to engage or disengage based on the usage information; and,
engaging or disengaging the selected sub-machine.

16. A method of operating an electric machine according to claim 15 in which the step of selecting comprises the step of selecting the sub-machine with the lowest usage, and engaging the selected sub-machine.

17. A method of operating an electric machine according to claim 15 in which the step of selecting comprises the step of selecting the sub-machine with the highest usage, and disengaging the selected sub-machine.

* * * * *